United States Patent
Baghel et al.

(10) Patent No.: US 12,328,785 B2
(45) Date of Patent: Jun. 10, 2025

(54) HANDLING OF SIDELINK RADIO LINK FAILURE

(71) Applicant: QUALCOMM Incorporated, San Diego, CA (US)

(72) Inventors: Sudhir Kumar Baghel, Hillsborough, NJ (US); Shuanshuan Wu, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 16/996,078

(22) Filed: Aug. 18, 2020

(65) Prior Publication Data

US 2021/0068187 A1 Mar. 4, 2021

Related U.S. Application Data

(60) Provisional application No. 62/893,675, filed on Aug. 29, 2019.

(51) Int. Cl.
*H04W 24/08* (2009.01)
*H04W 76/19* (2018.01)
(Continued)

(52) U.S. Cl.
CPC ........... *H04W 76/19* (2018.02); *H04W 24/08* (2013.01); *H04W 24/10* (2013.01); *H04W 92/18* (2013.01)

(58) Field of Classification Search
CPC ..... H04W 76/19; H04W 76/25; H04W 76/23; H04W 24/08; H04W 24/10; H04W 4/70; H04W 4/40; H04W 88/04; H04W 92/18
See application file for complete search history.

(56) References Cited

U.S. PATENT DOCUMENTS

2015/0087317 A1 3/2015 Yiu et al.
2015/0172970 A1 6/2015 Dai et al.
(Continued)

FOREIGN PATENT DOCUMENTS

CN 107210826 A 9/2017
CN 107771410 A 3/2018
(Continued)

OTHER PUBLICATIONS

Ericsson: "RLF Handling in Sidelink", 3GPP Draft, 3GPP TSG-RAN WG2 #107, R2-1910133—RLF Handling in Sidellnk. 3rd Generation Partnership Project (3GPP), Mobile Competence Centre, 650, Route Des Lucioles, F-06921, Sophia-Antipolis Cedex, France, vol. RAN WG2, No. Prague. Czech Republic, Aug. 26, 2019-Aug. 30, 2019, Aug. 15, 2019 (Aug. 15, 2019), XP051767914, 6 Pages, Retrieved from the Internet: URL:http://www.3gpp.org/ftp/tsg_ran/WG2_RL2/TSGR2_107/Docs/R2-1910133.zip [retrieved on Aug. 15, 2019] Paragraphs [0001]-[02 .1].
(Continued)

*Primary Examiner* — Meng Vang
*Assistant Examiner* — Hector Reyes
(74) *Attorney, Agent, or Firm* — Holland & Hart LLP/Qualcomm

(57) ABSTRACT

Methods, systems, and devices for wireless communications are described. A transmitter user equipment (UE), a receiver UE, or both of a sidelink communications link may detect a radio link failure (RLF) on the sidelink communications link. For example, the transmitter UE may perform a radio link monitoring procedure to identify the RLF. Additionally or alternatively, the receiver UE may detect if the RLF occurs based on using a timer or counter. Accordingly, the receiver UE may initiate the timer when no sidelink transmission is received and may declare RLF upon the timer expiring. The receiver UE may initiate the timer when a data
(Continued)

transmission is not received, when a data transmission is supposed to be received and is not received, not decoding sidelink control information (SCI), not receiving the SCI, etc.

26 Claims, 19 Drawing Sheets

(51) Int. Cl.
 *H04W 24/10* (2009.01)
 *H04W 92/18* (2009.01)

(56) References Cited

U.S. PATENT DOCUMENTS

| | | | |
|---|---|---|---|
| 2019/0081691 A1 | 3/2019 | Nagaraja et al. | |
| 2019/0289573 A1 | 9/2019 | Hwang et al. | |
| 2019/0363860 A1* | 11/2019 | Kim | H04L 5/10 |
| 2019/0380052 A1 | 12/2019 | Yang et al. | |
| 2020/0029384 A1 | 1/2020 | Hong et al. | |
| 2020/0045674 A1 | 2/2020 | Tseng et al. | |
| 2020/0100215 A1* | 3/2020 | Li | H04W 74/0808 |
| 2020/0229007 A1* | 7/2020 | Jung | H04W 72/04 |
| 2020/0252989 A1* | 8/2020 | Chen | H04L 5/0048 |
| 2020/0260353 A1* | 8/2020 | Xu | H04W 68/005 |
| 2020/0314939 A1* | 10/2020 | Park | H04W 76/14 |
| 2020/0337004 A1* | 10/2020 | Li | H04B 17/382 |
| 2020/0351707 A1* | 11/2020 | Cheng | H04W 76/14 |
| 2020/0351855 A1* | 11/2020 | Kung | H04L 1/1887 |
| 2021/0050954 A1* | 2/2021 | Ryu | H04W 4/40 |
| 2021/0051500 A1* | 2/2021 | Chae | H04L 5/0048 |
| 2021/0058833 A1* | 2/2021 | Basu Mallick | H04L 69/40 |
| 2021/0329510 A1* | 10/2021 | Tseng | H04W 76/11 |
| 2021/0336688 A1* | 10/2021 | Lee | H04W 4/40 |
| 2022/0022085 A1* | 1/2022 | Ji | H04W 76/19 |
| 2022/0046751 A1* | 2/2022 | Peng | H04W 76/25 |
| 2022/0104035 A1* | 3/2022 | Tenny | H04W 76/14 |
| 2022/0191962 A1* | 6/2022 | Di Girolamo | H04W 36/305 |

FOREIGN PATENT DOCUMENTS

| | | |
|---|---|---|
| WO | 2017176376 A1 | 10/2017 |
| WO | 2019028727 A1 | 2/2019 |
| WO | WO2020113367 A1 | 6/2020 |

OTHER PUBLICATIONS

Huawei., et al., "Correction on V2X Sidelink Communication in TS 36.300", 3GPP Draft, 3GPP TSG-RAN Meeting #104, 36300_CR1199R2_(REL-15)_R2-1816470_Correction on V2X Sidelink Communication in TS 36.300, 3rd Generation Partnership Project (3GPP), Mobile Competence Centre, 650, Route Des Lucioles, F-, vol. RAN WG2, No. Spokane, USA, Oct. 12, 2018-Oct. 16, 2018, Dec. 9, 2018 (Dec. 9, 2018), XP051553727, 12 Pages, Retrieved from the Internet: URL:http://www.3gpp.org/ftp/Meetings%5F3GPP%5FSYNC/RAN/Docs/RP%2D182678%2Ezip [retrieved on Dec. 9, 2018] p. 1.
Interdigital Inc: "RLM/RLF and RRM for NR V2X", 3GPP Draft, 3GPP RAN WG2 Meeting #105, R2-1901579 (R16 V2X SI A11421 RLM_RLF), 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051602934, 4 Pages, Retrieved from the Internet: URL: http://www.3gpp.org/ftp/tsg%5Fran/WG2%5FRL2/TSGR2%5F105/Docs/R2%2D1901579%2Ezip, [retrieved on Feb. 15, 2019], p. 4, Section 2.
International Search Report and Written Opinion—PCT/US2020/046956—ISA/EPO—Dec. 10, 2020.
VIVO: "Open Issues for Sidelink Link Failure and Release", 3GPP Draft, 3GPP TSG-RAN WG2 Meeting #106, R2-1905845_Open Issues for Sidelink Link Failure and Release, 3rd Generation Partnership Project (3GPP), Mobile Competence Centre, 650, Route Des Lucioles, F-06921, Sophia-Antipolis Cedex, vol. RAN WG2, No. Reno, USA, May 13, 2019-May 17, 2019, May 13, 2019 (May 13, 2019), XP051729343, 3 Pages, Retrieved from the Internet: URL:http://www.3gpp.org/ftp/Meetings%5F3GPP%5FSYNC/RAN2/Docs/R2%2D1905845%2Ezip [retrieved on May 13, 2019] pp. 1-3.

* cited by examiner

HANDLING OF SIDELINK RADIO LINK FAILURE

CROSS REFERENCE

The present Application for patent claims the benefit of U.S. Provisional Patent Application No. 62/893,675 by BAGHEL et al., entitled "HANDLING OF SIDELINK RADIO LINK FAILURE," filed Aug. 29, 2019, assigned to the assignee hereof, and expressly incorporated by reference herein.

FIELD OF TECHNOLOGY

The following relates generally to wireless communications, and more specifically to handling of sidelink radio link failure (RLF).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some cases, UEs may communicate directly with one another without transmitting through a base station or through a relay point. This type of communication may be referred to as sidelink, device-to-device (D2D), vehicle-to-vehicle (V2V) communications, or another term for sidelink communications between two UEs. In the sidelink communications, efficient techniques are desired for monitoring and maintaining a sidelink connection between UEs.

SUMMARY

The described techniques relate to improved methods, systems, devices, and apparatuses that support handling of sidelink radio link failure (RLF). Generally, the described techniques provide for detecting an RLF on a sidelink channel (e.g., sidelink connection) between a transmitter user equipment (UE) (e.g., a first UE) and a receiver UE (e.g., a second UE). For example, the transmitter UE may perform a radio link monitoring (RLM) procedure to identify the RLF based on monitoring the sidelink channel for acknowledgment (ACK) feedback from the receiving UE of the sidelink channel. If a number of consecutive ACKs are not received by the transmitter UE or an ACK is not received before a timer expires, the transmitter UE may determine an RLF has occurred on the sidelink channel and report the RLF. In some cases, the transmitter UE may report the RLF by transmitting an indication of the RLF to a scheduling base station (e.g., via radio resource control (RRC) signaling). Additionally or alternatively, the transmitter UE may send a connection reestablishment request to the scheduling base station to reestablish the sidelink connection with the receiver UE. In some cases, the transmitter UE may stop transmitting data to the receiver UE when the RLF is declared or determined.

Additionally or alternatively, the receiver UE may perform techniques to determine if an RLF occurs on the sidelink channel with the transmitter UE. For example, the receiver UE may detect if the RLF occurs based on using a timer or counter. Accordingly, the receiver UE may initiate the timer (e.g., or counter) when no sidelink transmission is received from the transmitter UE and may declare RLF upon the timer expiring. The receiver UE may initiate (e.g., start) the timer when a data transmission is not received, when a data transmission is supposed to be received (e.g., as indicated by the transmitter UE, based on a periodic schedule, etc.) and is not received, not decoding sidelink control information (SCI), not receiving the SCI, etc. If SCI is decoded before the timer expires, the receiver UE may reset the timer and start counting down after a next occurring failed SCI decoding. After the RLF is detected, the receiver UE may report the RLF to the scheduling base station (e.g., via RRC signaling) or to the transmitter UE (e.g., via a medium access control (MAC) control element (CE)). In some cases, the receiver UE may release the sidelink connection with the transmitter UE based on the RLF.

A method of wireless communications at a first UE is described. The method may include monitoring a sidelink communications link with a second UE as part of an RLM procedure for the sidelink communications link, detecting an RLF of the sidelink communications link based on the monitoring, and reporting the RLF based on the detection of the RLF.

An apparatus for wireless communications at a first UE is described. The apparatus may include a processor, memory coupled with the processor, and instructions stored in the memory. The instructions may be executable by the processor to cause the apparatus to monitor a sidelink communications link with a second UE as part of an RLM procedure for the sidelink communications link, to detect an RLF of the sidelink communications link based on the monitoring, and to report the RLF based on the detection of the RLF.

Another apparatus for wireless communications at a first UE is described. The apparatus may include means for monitoring a sidelink communications link with a second UE as part of an RLM procedure for the sidelink communications link, means for detecting an RLF of the sidelink communications link based on the monitoring, and means for reporting the RLF based on the detection of the RLF.

A non-transitory computer-readable medium storing code for wireless communications at a first UE is described. The code may include instructions executable by a processor to monitor a sidelink communications link with a second UE as part of an RLM procedure for the sidelink communications link, to detect an RLF of the sidelink communications link based on the monitoring, and to report the RLF based on the detection of the RLF.

In some examples of the method, apparatuses, and non-transitory computer-readable medium described herein, reporting the RLF may include operations, features, means, or instructions for transmitting, to a base station, an indication of the RLF via RRC signaling.

In some examples of the method, apparatuses, and non-transitory computer-readable medium described herein, reporting the RLF may include operations, features, means, or instructions for transmitting, to a base station, a request for a sidelink connection reestablishment with the second UE.

In some examples of the method, apparatuses, and non-transitory computer-readable medium described herein, detecting the RLF may include operations, features, means, or instructions for transmitting, to the second UE and via the sidelink communications link, one or more sidelink messages in one or more transmission time intervals (TTIs), monitoring the sidelink communications link for feedback messages from the second UE and in response to the one or more sidelink messages in one or more subsequent TTIs after the one or more TTIs, and determining the RLF based on one or more unsuccessful receipts of the feedback messages based on the monitoring.

Some examples of the method, apparatuses, and non-transitory computer-readable medium described herein may further include operations, features, means, or instructions for refraining from transmitting messages via the sidelink communications link to the second UE based on the detection of the RLF.

In some examples of the method, apparatuses, and non-transitory computer-readable medium described herein, the first UE may be a transmitter UE for the sidelink communications link, and the second UE may be a receiver UE for the sidelink communications link.

A method of wireless communications at a second UE is described. The method may include identifying a TTI for sidelink transmissions from a first UE via a sidelink communications link, monitoring the sidelink communications link for one or more sidelink transmissions from the first UE during the TTI, and initiating a timer based on an unsuccessful receipt of the one or more sidelink transmissions in the TTI.

An apparatus for wireless communications at a second UE is described. The apparatus may include a processor, memory coupled with the processor, and instructions stored in the memory. The instructions may be executable by the processor to cause the apparatus to identify a TTI for sidelink transmissions from a first UE via a sidelink communications link, to monitor the sidelink communications link for one or more sidelink transmissions from the first UE during the TTI, and to initiate a timer based on an unsuccessful receipt of the one or more sidelink transmissions in the TTI.

Another apparatus for wireless communications at a second UE is described. The apparatus may include means for identifying a TTI for sidelink transmissions from a first UE via a sidelink communications link, means for monitoring the sidelink communications link for one or more sidelink transmissions from the first UE during the TTI, and means for initiating a timer based on an unsuccessful receipt of the one or more sidelink transmissions in the TTI.

A non-transitory computer-readable medium storing code for wireless communications at a second UE is described. The code may include instructions executable by a processor to identify a TTI for sidelink transmissions from a first UE via a sidelink communications link, to monitor the sidelink communications link for one or more sidelink transmissions from the first UE during the TTI, and to initiate a timer based on an unsuccessful receipt of the one or more sidelink transmissions in the TTI.

Some examples of the method, apparatuses, and non-transitory computer-readable medium described herein may further include operations, features, means, or instructions for determining an RLF for the sidelink communications link based on the timer exceeding a threshold value.

Some examples of the method, apparatuses, and non-transitory computer-readable medium described herein may further include operations, features, means, or instructions for determining the threshold value based on a pre-configured value, a value determined during establishment of the sidelink communications link, a priority level associated with data transmitted via the sidelink communications link, an indication from a base station, or a combination thereof.

In some examples of the method, apparatuses, and non-transitory computer-readable medium described herein, the value determined during establishment of the sidelink communications link may be based on a speed of the first UE or the second UE, a congestion level of the sidelink communications link, the priority level associated with data transmitted via the sidelink communications link, an application for which the sidelink communications link may be used, or a combination thereof.

Some examples of the method, apparatuses, and non-transitory computer-readable medium described herein may further include operations, features, means, or instructions for determining an upper bound and a lower bound for the threshold value, where the upper bound and the lower bound may be based on pre-configured values, a priority level associated with data transmitted via the sidelink communications link, an application for which the sidelink communications link may be used, or a combination thereof.

Some examples of the method, apparatuses, and non-transitory computer-readable medium described herein may further include operations, features, means, or instructions for reconfiguring the threshold value based on a change in speed of the first UE or the second UE, a congestion level of the sidelink communications link, a change in a priority level associated with data transmitted via the sidelink communications link, or a combination thereof.

Some examples of the method, apparatuses, and non-transitory computer-readable medium described herein may further include operations, features, means, or instructions for reporting the RLF based on the determination of the RLF.

In some examples of the method, apparatuses, and non-transitory computer-readable medium described herein, reporting the RLF may include operations, features, means, or instructions for transmitting, to a base station, an indication of the RLF via RRC signaling.

In some examples of the method, apparatuses, and non-transitory computer-readable medium described herein, reporting the RLF further may include operations, features, means, or instructions for transmitting, to the first UE, an indication of the RLF via sidelink signaling.

Some examples of the method, apparatuses, and non-transitory computer-readable medium described herein may further include operations, features, means, or instructions for releasing a sidelink communications connection with the first UE based on the determination of the RLF.

Some examples of the method, apparatuses, and non-transitory computer-readable medium described herein may further include operations, features, means, or instructions for determining the unsuccessful receipt of the one or more sidelink transmissions based on failing to decode the SCI or sidelink data during the TTI.

In some examples of the method, apparatuses, and non-transitory computer-readable medium described herein, the timer may include a timer that starts counting down based on the unsuccessful receipt of the one or more sidelink transmissions.

In some examples of the method, apparatuses, and non-transitory computer-readable medium described herein, the first UE may be a transmitter UE for the sidelink communications link, and the second UE may be a receiver UE for the sidelink communications link.

DETAILED DESCRIPTION

Figure 1:
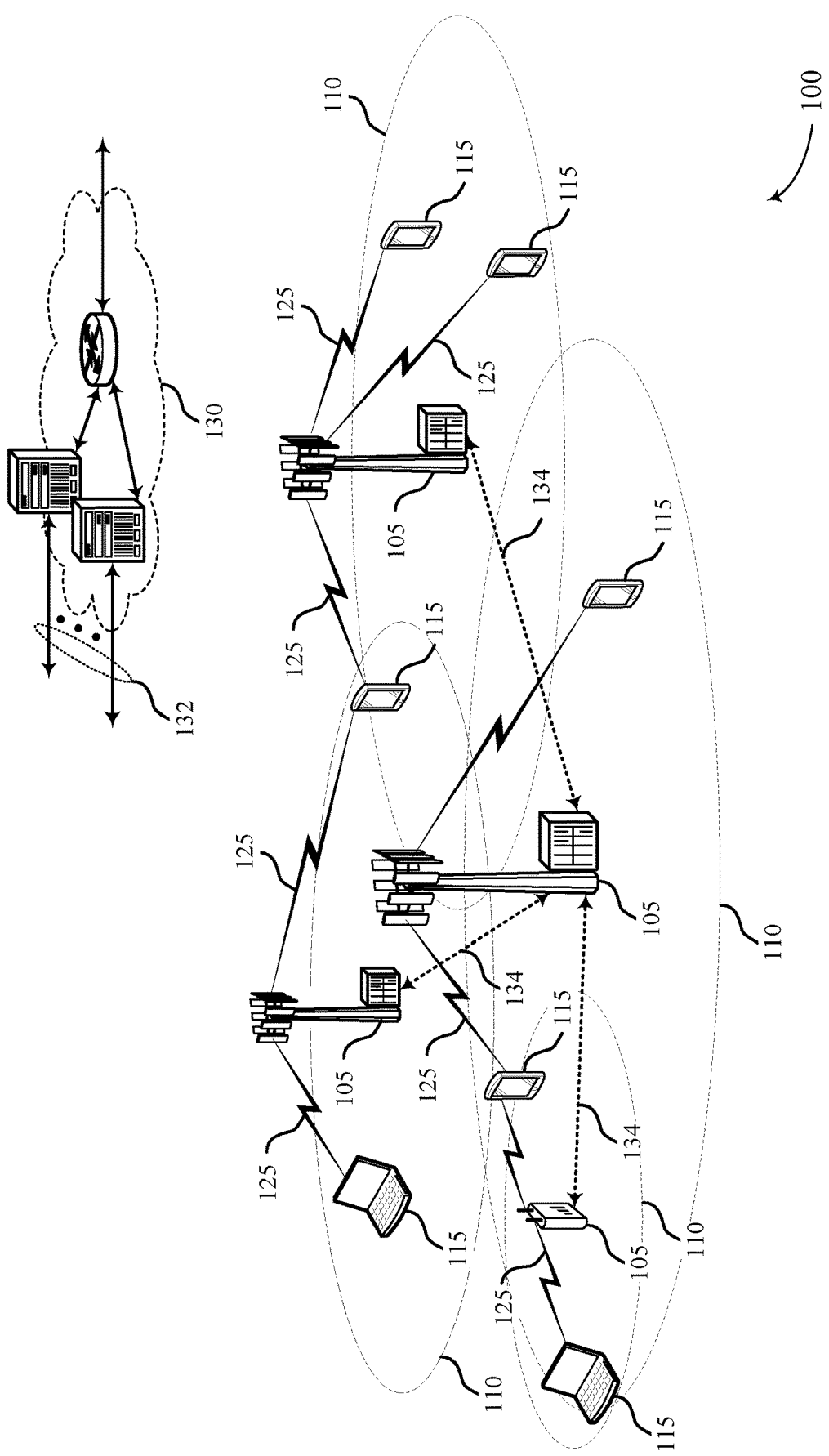
FIG. 1 illustrates an example of a system for wireless communications that supports handling of sidelink radio link failure (RLF) in accordance with aspects of the present disclosure.

In some cases of a wireless communications system, a user equipment (UE) and a base station may communicate over radio links. The UE or the base station may monitor the radio link to check for a radio link failure (RLF). The UE or the base station may monitor for the RLF by monitoring particular signals in a channel. For example, in the case of 5G NR downlink, a UE may measure synchronization signal blocks (SSBs) or channel state information reference signals (CSI-RSs) as part of a radio link monitoring (RLM) procedure.

In other cases, one or more UEs may communicate directly with one another on sidelink communication channels. This communication configuration may in some cases not include one UE relaying messages to other UEs through a base station. A sidelink communications configuration may be an example of device-to-device (D2D) communication, vehicle-to-vehicle (V2V) communication, or another example of sidelink communication in an Internet-of-Everything (IoE) communications system.

In cases of sidelink communications, performing an RLM procedure by measuring SSBs and CSI-RSs of channels may not be as reliable as in other types of communications (e.g., cellular link-to-UE communications or base station-to-UE communications) because multiple UEs may utilize a same SSB. Thus, measurements on the SSB may not correspond correctly to the intended sidelink channel or UE. Further, SSB transmissions may be decoupled from data transmissions, resulting in a UE that is transmitting data being possibly different than a UE that is transmitting an SSB. Additionally, in some cases, CSI-RSs may also not be present in sidelink communication channels, and thus, a UE may not rely on CSI-RSs in sidelink communications for performing the RLM procedure.

A UE transmitting data in a sidelink communications configuration (e.g., a transmitter UE) may perform RLM by monitoring for and detecting hybrid automatic repeat request (HARQ) feedback (such as an acknowledgment (ACK)/negative acknowledgment (NACK) feedback message). For example, a first UE may transmit a data packet to a second UE, and the first UE may then monitor for a HARQ response from the second UE including ACK/NACK feedback indicating the status of the reception of the message by the second UE.

Additionally, RLM may be performed in unicast and multicast sidelink scenarios. In a unicast configuration, RLM may be performed to determine if the connection between two UEs communicating over a sidelink fails or does not fail. RLM may also be performed in a groupcast (e.g., multicast) sidelink scenario, where one UE may transmit the same data transmission to more than one other UEs in a sidelink. In groupcast, RLM may be performed to determine if any of the one-to-many connections between the UE transmitting the data and the UEs receiving the data fails or does not fail. A failure in either the unicast configuration or the groupcast configuration may be an RLF.

In a sidelink communications system, a first UE may transmit a message (e.g., a data packet) over a sidelink channel to one or more other UEs. The UE may monitor for ACK/NACK feedback from a receiving UE in a particular transmission time interval (TTI) (e.g., a slot). In some cases, the first UE may determine that a HARQ feedback failure has occurred in the particular TTI (e.g., a slot). To perform RLM, the first UE may initiate a counter (e.g., a timer) in the TTI corresponding to the expected transmission of the ACK/NACK from the receiving UE. RLF may be declared by the first UE when the counter counts to a threshold number of failures, or if a successful HARQ feedback is not received prior to a timer counting down to zero. The expiration of the counter may correspond to consecutive failure of HARQ feedback from the receiving UE. Failure of HARQ feedback may occur due to failure of a HARQ feedback transmission by the receiving UE (e.g., the receiving UE fails decoding sidelink control information (SCI) from the transmitting UE, the receiving UE would not transmit HARQ feedback), failure of HARQ feedback decoding by the transmitting UE, or if the transmitting UE receives the HARQ feedback, successfully decodes it, and determines that the HARQ feedback is a NACK.

Thus, a UE may conduct RLM based on HARQ feedback detection to determine or declare RLF in a sidelink communications system without SSBs or CSI-RSs. The UE may declare RLF and may then take actions to recover the connection to resolve the RLF. The UE may then re-establish the connection between the UE and the receiving UE.

Additionally or alternatively, the receiving UE may also detect if an RLF occurs based on using a timer (e.g., or counter). For example, the receiving UE may initiate the timer when no sidelink transmission is received and may declare RLF upon the timer expiring. The timer may have a value determined based on a pre-configured value, negotiated between the communicating UEs (e.g., transmitting UE and receiving UE) during the sidelink establishment, mapped from data priority, indicated by a base station, etc. Additionally, the negotiations may use UE speed, congestion level, data priority, application type, or a combination thereof to determine the timer value. In some cases, the timer may include a range with upper and lower bounds determined from pre-configured values, data priority, application type, or a combination thereof.

Additionally, the receiving UE may start the timer when a data transmission is not received, when a data transmission is supposed to be received (e.g., as indicated by the transmitting UE, based on a periodic schedule, etc.) and is not received. For example, a data transmission not being received may include no SCI being successfully decoded, SCI being successfully decoded but decoding of the data transmission indicated by the SCI fails, etc. If SCI is decoded before the timer expires, the receiving UE may reset the timer and start counting down after a next occurring failed SCI decoding. In some cases, the timer value may be reconfigured when there is a change in UE speed, change in congestion level, change in priority level of the data, or a combination thereof.

After the RLF is detected, the transmitting UE may report the RLF to a scheduling base station via radio resource control (RRC) signaling or by transmitting a request to the base station for a connection reestablishment with the receiving UE. Additionally or alternatively, the receiving UE may report the RLF to the scheduling base station also via RRC signaling or to the transmitting UE via sidelink signaling (e.g., a medium access control (MAC) control element (CE), RRC signaling, etc.). In some cases, the receiving UE may release the sidelink communications connection with the transmitting UE based on the RLF. Similarly, the transmitting UE may stop transmitting data to the receiving UE when RLF is declared or determined.

Aspects of the disclosure are initially described in the context of a wireless communications system. Additionally, aspects of the disclosure are illustrated by an additional wireless communications system, slot diagram examples, a receiver RLF detection timer, and a process flow. Aspects of the disclosure are further illustrated by and described with reference to apparatus diagrams, system diagrams, and flowcharts that relate to handling of sidelink RLF.

FIG. 1 illustrates an example of a wireless communications system 100 that supports handling of sidelink RLF in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more UEs 115 may communicate directly with one another over communication links in a sidelink communication configuration. A transmitter UE 115 may perform RLM over the communication links with one or more other receiving UEs 115. Conventionally, RLM over a cellular link between a base station 105 and a UE 115 may generally include monitoring of an SSB transmitted by the UE 115 or the base station 105 or measurement of the radio link using a CSI-RS transmitted by the UE 115 or the base station 105. SSBs and CSI-RS may not always be available or reliable in sidelink communications between one or more UEs 115.

Thus, a transmitting UE 115 may perform RLM in a sidelink configuration by monitoring for HARQ feedback from other receiving UEs 115 based on an initial data transmission by the transmitting UE 115. Based on a first HARQ feedback failure, the transmitting UE 115 may initiate a counter or a timer to quantify the number of HARQ feedback failures or the amount of time corresponding to a number of HARQ feedback failures. When the counter or timer reaches a threshold value, the transmitting UE 115 may declare RLF in the sidelink channel and may initiate actions to reconnect with the one or more other receiving UEs 115. In some cases, after declaring the RLF, the transmitting UE 115 may report the RLF to a scheduling base station 105 via RRC signaling or by transmitting a request to the base station 105 for a connection reestablishment with the one or more receiving UEs 115. Additionally, the transmitting UE 115 may stop transmitting data to the one or more receiving UEs 115 when RLF is declared.

Additionally or alternatively, one of the receiving UEs 115 may also monitor for and detect if an RLF occurs based on using a timer. For example, the receiving UE 115 may initiate the timer when no sidelink transmission is received and may declare RLF upon the timer expiring. In some cases, the receiving UE 115 may start the timer when a data transmission is not received, when a data transmission is supposed to be received (e.g., as indicated by the transmitting UE 115, based on a periodic schedule, etc.) and is not received, not successfully decoding SCI, not receiving the SCI, successfully decoding the SCI but not decoding a data transmission indication by the SCI, or a combination thereof. If SCI is decoded before the timer expires, the receiving UE 115 may reset the timer and start counting down after a next occurring failed SCI decoding. Subsequently, after detecting the RLF, the receiving UE 115 may report the RLF to a base station 105 (e.g., the scheduling base station 105 or an anchored base station 105 for receiving UE 115) via RRC signaling or to the transmitting UE 115 via sidelink signaling (e.g., a MAC CE, RRC, etc.). In some cases, the receiving UE 115 may release the sidelink communications with the transmitting UE 115 based on the RLF.

Figure 2:
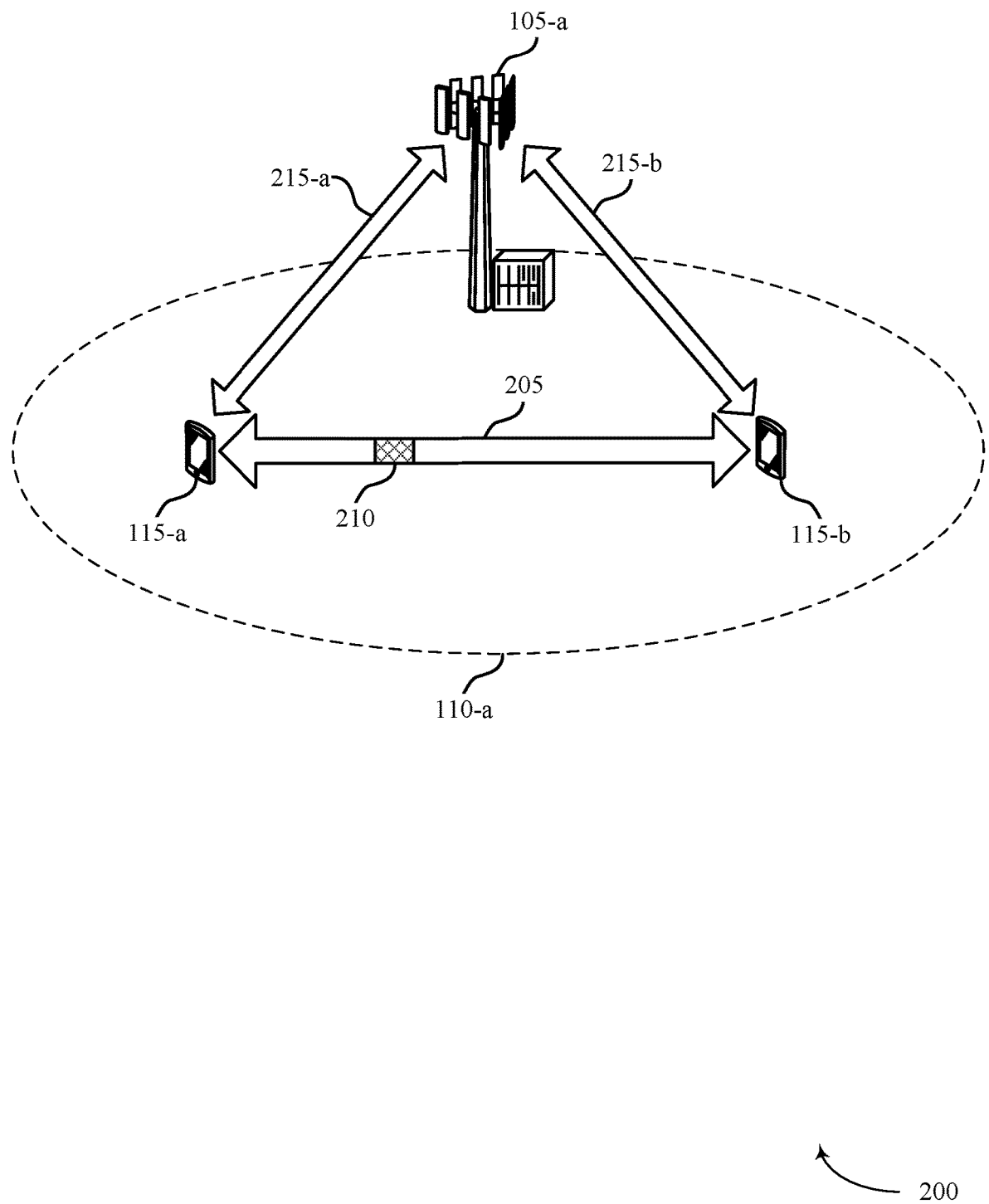
FIG. 2 illustrates an example of a wireless communications system that supports handling of sidelink RLF in accordance with aspects of the present disclosure.

FIG. 2 illustrates an example of a wireless communications system 200 that supports handling of sidelink RLF in accordance with aspects of the present disclosure. Wireless communications system 200 may be an example of wireless communications system 100. Wireless communications system 200 may include a base station 105-a and UEs 115-a and 115-b. Base station 105-a may be an example of a base station 105 as described with respect to FIG. 1. UEs 115-a and 115-b may be examples of UEs 115 as described with respect to FIG. 1. Base station 105-a may serve one or more UEs 115 within coverage area 110-a. Base station 105-a may communicate with the one or more UEs 115 via communication links 215. UE 115-a and UE 115-b may be connected in a sidelink communication configuration and may communicate over a sidelink channel 205. Wireless communications system 200 may represent an example of a unicast sidelink configuration, but the RLM technique described herein may also apply in a multicast or broadcast sidelink configuration.

UE 115-a may transmit, over sidelink channel 205, a first message 210. For example, UE 115-a may transmit message 210 in a first TTI (e.g., in a slot N). Based on the transmission of the first message 210, UE 115-*a* may expect to receive HARQ feedback from UE 115-*b*, such as an ACK/NACK message. UE 115-*a* may monitor for the HARQ feedback in a second TTI (e.g., slot N+K). Based on the monitoring for the HARQ feedback in the second TTI, UE 115-*a* may initiate a counter or a timer which may count a number of successive HARQ feedback failures. When the counter counts to a threshold number of HARQ failures or the timer counts down to zero, UE 115-*a* may declare RLF.

In some cases, UE 115-*a* may receive an ACK from UE 115-*b* over sidelink channel 205 in the expected TTI and may correctly decode the ACK. In other cases, there may be a failure in HARQ feedback from UE 115-*b*. The HARQ feedback failure may be due to one or more causes. For example, UE 115-*b* may transmit a NACK to UE 115-*a*, where the NACK indicates the HARQ feedback failure. Additionally or alternatively, UE 115-*a* may expect and receive the HARQ feedback from UE 115-*b*, where UE 115-*b* transmits an ACK with the HARQ feedback, but UE 115-*a* may be unable to decode the HARQ feedback. Even though UE 115-*b* transmitted an ACK, UE 115-*a* being unable to decode the HARQ feedback may also qualify as a HARQ feedback failure. Additionally or alternatively, UE 115-*a* may correctly decode the HARQ feedback, but the HARQ feedback may indicate a NACK. Accordingly, the NACK may also qualify as a HARQ feedback failure.

UE 115-*a* may initiate the counter or timer in slot N+K if the HARQ feedback is not received in the slot N+K (e.g., or another HARQ feedback failure occurs as described previously). If the HARQ feedback is not received in slot N+K or in another, later slot, before the counter meets a threshold or the timer counts to zero, UE 115-*a* may declare RLF. If HARQ feedback is received before the expiration of the counter or timer (e.g., and the HARQ feedback is successfully decoded with containing an ACK), UE 115-*a* may reset the counter or timer. In some cases, UE 115-*a* may start the counter or timer again at a next instance of a failed HARQ feedback in a slot.

In cases where UE 115-*a* declares RLF of sidelink 205 based on the counter or timer reaching a threshold value, UE 115-*a* may perform actions to reestablish connection with UE 115-*b*. These actions to reestablish connection with UE 115-*b* may involve communications with base station 105-*a* over link 215-*a* to reestablish contact with UE 115-*b* over communication link 215-*b*.

The counter (or the timer associated with the counter) started by UE 115-*a* based on the monitoring for the HARQ feedback may have a specified value that is determined based on one or more parameters. In some cases, the counter may have a common pre-configured value. The preconfigured value may be based on a wireless communication standard (e.g., 3GPP) and may be configured at UE 115-*a* based on control signaling from base station 105-*a* or another device (e.g., UE 115-*b* or another UE 115). In some cases, the counter may be negotiated between UE 115-*a* and UE 115-*b* during the establishment of the sidelink connection (e.g., via RRC signaling). The counter value may be negotiated based on or more of UE communication parameters, such as speed of a UE 115 (speed of UE 115-*a*, speed of UE 115-*b*, or relative speed between UEs 115-*a* and 115-*b*), congestion level, data priority, application type, or another communication parameter.

For example, the counter or timer may have a greater value in cases where the congestion level is lower. The congestion level may be measured based on a channel quality measurement, such as a reference signal received power (RSRP), a reference signal received quality (RSRQ), a channel busy ratio (CBR), or another congestion measurement. UE 115-*a* and UE 115-*b* may determine the congestion measurement, where the congestion measurement may be negotiated between UEs 115-*a* and 115-*b*. In other cases, base station 105-*a* may signal the congestion measurement to one or both of UEs 115-*a* and 115-*b* based on measurements performed by or signaled to base station 105-*a*. The congestion measurement may then be mapped to a timer value.

The counter or timer may also be mapped based on the data priority. For example, the counter may have a greater value if the data priority is lower. The data priority may be based on a relative priority of the message transmitted from the transmitting UE to the receiving UE in comparison to other data transmissions by the transmitting UE or other communications within the system. The counter may also have a smaller value if the data transmission is for a safety message transmission. The safety message transmission may be an example of a high priority message.

The counter or timer may also have a value within a specified range, rather than have a distinct value. The counter value range may have an upper bound and a lower bound. The upper bound and the lower bound may be predefined or preconfigured to UEs 115-*a* and 115-*b* (e.g., based on a wireless communications standard or control signaling from a base station, or both). The range may also be negotiated between UE 115-*a* and UE 115-*b* in the sidelink system. The range of the counter value may depend on data priority or the type of application of the data transmission. For example, if the data type is a high priority safety message, the counter may still have a range of values, but the upper bound of the range of values for the timer may be smaller, so that the counter has a smaller value.

The value of the counter or timer may be indicated by a network node (e.g., base station 105-*a*). The indication of the value of the counter or timer being indicated by the network node may apply in cases where the sidelink communication is scheduled by base station 105-*a*. For example, base station 105-*a* may select the counter value based on the UE speed or congestion level. The UEs 115-*a* and 115-*b* (e.g., and any additional UEs 115 in coverage area 110-*a*) may report the UE speed or congestion level to base station 105-*a*.

The counter or timer may be activated based on UE 115-*a* monitoring particular TTIs for HARQ feedback from UE 115-*b*. The counter may increment each time a HARQ feedback failure is detected by UE 115-*a*. In some cases, the counter may increment until a threshold number of HARQ feedback failures occurs, at which point UE 115-*b* may declare RLF. In other cases, the counter may be or correspond to a timer, which may count down based on the value of the timer. The value of the timer may be determined based on the same parameters as the value of the counter (e.g., pre-configuration, UE speed, congestion level, application type, data priority, etc.).

As described above, UE 115-*a* may be referred to as a transmitting UE 115-*a* (e.g., transmitter UE 115, first UE 115, etc.) based on transmitting the first message 210 to UE 115-*b* over the sidelink channel 205, and, accordingly, UE 115-*b* may be referred to as a receiving UE 115-*b* (e.g., receiver UE 115, second UE 115, etc.) based on receiving the first message 210 over the sidelink channel 205. In some cases, the receiver UE 115-*b* may monitor for and detect an RLF for the sidelink channel 205 based on a timer similar to the timer described herein used by transmitter UE 115-*a* for performing an RLM procedure to monitor for HARQ feedback from receiving UE 115-*b*.

For example, the timer used by the receiving UE 115-*b* to detect an RLF may have a specified value that is determined based on one or more parameters. In some cases, the timer may have a common pre-configured value as described herein. Additionally or alternatively, the timer may be negotiated between UE 115-*a* and UE 115-*b* during the establishment of the sidelink connection as described herein (e.g., based on one or more UE communication parameters, such as speed of a UE 115, congestion level, data priority, application type, or another communication parameter). In some cases, the timer may also be mapped based on the data priority as described herein. Additionally or alternatively, the value of the timer may be indicated by a network node (e.g., base station 105-*a*) as also described herein. Additionally, the timer for the receiving UE 115-*b* to detect RLF may also have a value within a specified range, rather than have a distinct value as described herein.

The timer used by the receiving UE 115-*b* to detect the RLF may count an elapsed time of consecutive failures of decoding of data transmissions from the transmitting UE 115-*a*. For example, the receiving UE 115-*b* may start the timer when a data transmission is not received. In some cases, the receiving UE 115-*b* may successfully decode a first data transmission in a slot n but then fail to decode a second data transmission in a slot n+1. Accordingly, the receiving UE 115-*b* may start counting down the timer from slot n+1.

Additionally or alternatively, the receiving UE 115-*b* may start the timer from an occasion when data is supposed to be received. For example, the transmitting UE 115-*a* may indicate that there would be a data transmission in a slot n (e.g., based on a resource reservation procedure), but the receiving UE 115-*b* may fail the decoding of a data transmission in slot n. Accordingly, the receiving UE 115-*b* may start counting down the timer from slot n. In some cases, the data transmissions from the transmitting UE 115-*a* may be periodical (e.g., with a periodicity k). As such, the receiving UE 115-*b* may identify when the periodic data transmissions should be transmitted by the transmitting UE 115-*a* and received at the receiving UE 115-*b*. For example, the receiving UE 115-*b* may successfully decode a periodic data transmission in slot n but may fail to decode a next occurring periodic data transmission in slot n+k (e.g., based on the periodicity k). Accordingly, the receiving UE 115-*b* may start counting down the timer from slot n+k.

For the described scenarios where the receiving UE 115-*b* is monitoring for the RLF, the receiving UE 115-*b* may start counting down the timer or keep counting down the timer based on a failure of decoding of a data transmission. This failure of decoding a data transmission may include no SCI from the transmitting UE 115-*a* (e.g., data transmitter) can be decoded in the data transmission, no SCI can be decoded from the transmitting UE 115-*a*, the SCI can be decoded but the data decoding failed of the data transmission, or a combination thereof.

In some cases, the receiving UE 115-*b*, the transmitting UE 115-*a*, or both may reconfigure the value of the timer based on one or more parameters changing. For example, renegotiation of the timer value may be triggered between UE 115-*a* and UE 115-*b* when one or more of the UE communication parameters as described change since a most recent negotiation of the timer. For example, a change of UE speed may trigger the timer value renegotiation. In some cases, the UE speed may change from a high speed category to a mid-speed category, a difference of the UE speed may exceed a threshold, or a combination thereof. Additionally or alternatively, a change in the congestion level may trigger the timer value renegotiation (e.g., a difference of a measured RSRQ exceeds a threshold). In some cases, the timer value renegotiation may also be triggered by a change in data priority for data transmitted on sidelink channel 205.

After the RLF is detected, the transmitting UE 115-*a* may report the RLF to base station 105-*a* (e.g., a scheduling base station) via RRC signaling (e.g., higher layer signaling) or by transmitting a request to base station 105-*a* for a connection reestablishment with the receiving UE 115-*b*. Additionally or alternatively, the receiving UE 115-*b* may report the RLF to base station 105-*a* also via RRC signaling or to the transmitting UE 115-*a* via a MAC CE. In some cases, the receiving UE 115-*b* may release the sidelink channel 205 (e.g., sidelink communications link) with the transmitting UE 115-*a* based on the RLF. Similarly, the transmitting UE 115-*a* may stop transmitting data to the receiving UE 115-*b* when RLF is declared or determined.

Figure 3A:
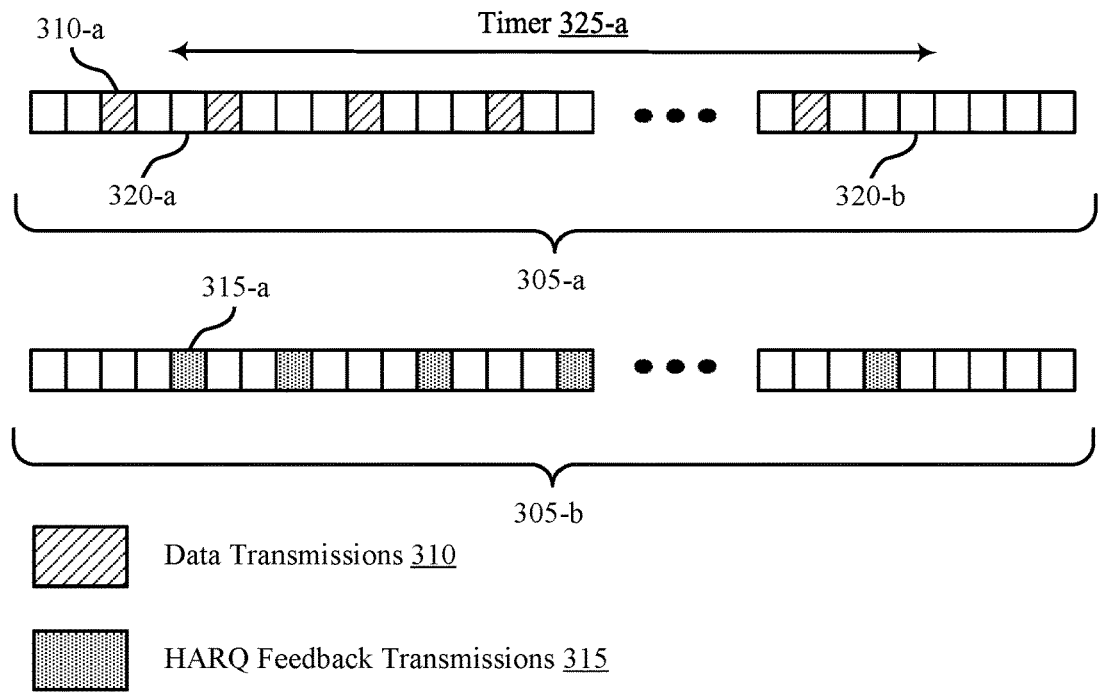
FIGS. 3A and 3B illustrate examples of slot diagrams that support handling of sidelink RLF in accordance with aspects of the present disclosure.

FIG. 3A illustrates an example of a slot diagram 301 that supports handling of sidelink RLF in accordance with aspects of the present disclosure. UEs 115 operating in a sidelink configuration may receive and transmit messages based on slot diagram 301. A first, transmitting UE 115 (e.g., UE 115-*a* as described with respect to FIG. 2) may transmit data transmissions 310 according to a transmission configuration 305-*a*. A second, receiving UE 115 (e.g., UE 115-*b*) may transmit HARQ feedback transmissions 315 based on a transmission configuration 305-*b*. A timer 325-*a* may be initiated by the transmitting UE 115 (e.g., UE 115-*a*) based on monitoring for HARQ feedback transmissions 315 received from the receiving UE 115 (e.g., UE 115-*b*).

The first UE 115 (e.g., UE 115-*a*) may transmit data transmissions 310 in particular slots according to transmission configuration 305-*a*. For example, the first UE 115 may transmit a first data transmission 310-*a* in a particular slot or a TTI N based on transmission configuration 305-*a*. The first UE 115 may transmit first data transmission 310-*a* to the second UE 115 in a sidelink communications channel (e.g., sidelink channel 205). Based on transmitting first data transmission 310-*a*, the first UE 115 may monitor for a HARQ feedback transmission 315-*a* from the second UE 115 in a slot 320-*a*.

In some cases, HARQ feedback transmission 315-*a* may correspond to a HARQ feedback failure. The HARQ feedback failure may occur based on HARQ feedback transmission 315-*a* being decoded by the first UE but HARQ feedback transmission 315-*a* including a NACK feedback transmission. In other cases, a HARQ feedback failure may include that HARQ feedback transmission 315-*a* is not decoded correctly at the first UE 115. Additionally or alternatively, a HARQ feedback failure may include the first UE 115 not receiving HARQ feedback transmission 315-*a*. In any case of one of these HARQ feedback failures, the first UE 115 may initiate a timer 325 based on determining a HARQ feedback failure occurs.

For example, a HARQ feedback failure may occur in slot 320-*a* (e.g., corresponding to the slot that the second UE 115 is transmitting HARQ feedback transmission 315-*a*). Based on this HARQ feedback failure, the first UE 115 may initiate a timer 325-*a*. The timer 325-*a* may have a length of time based on a pre-configuration or based on one or more parameters, such as data priority, speed of the first or second UE, congestion level, or another UE parameter, etc. Timer 325-*a* may count down for the configured length of time until the threshold time period (either counting down to zero or counting up to a configured time) or until HARQ feedback is successfully received. If the timer 325-*a* counts down to zero (e.g., or up to the configured time or threshold)

before the HARQ feedback is successfully received by the first UE 115, the first UE 115 may declare that an RLF has occurred.

Figure 3B:
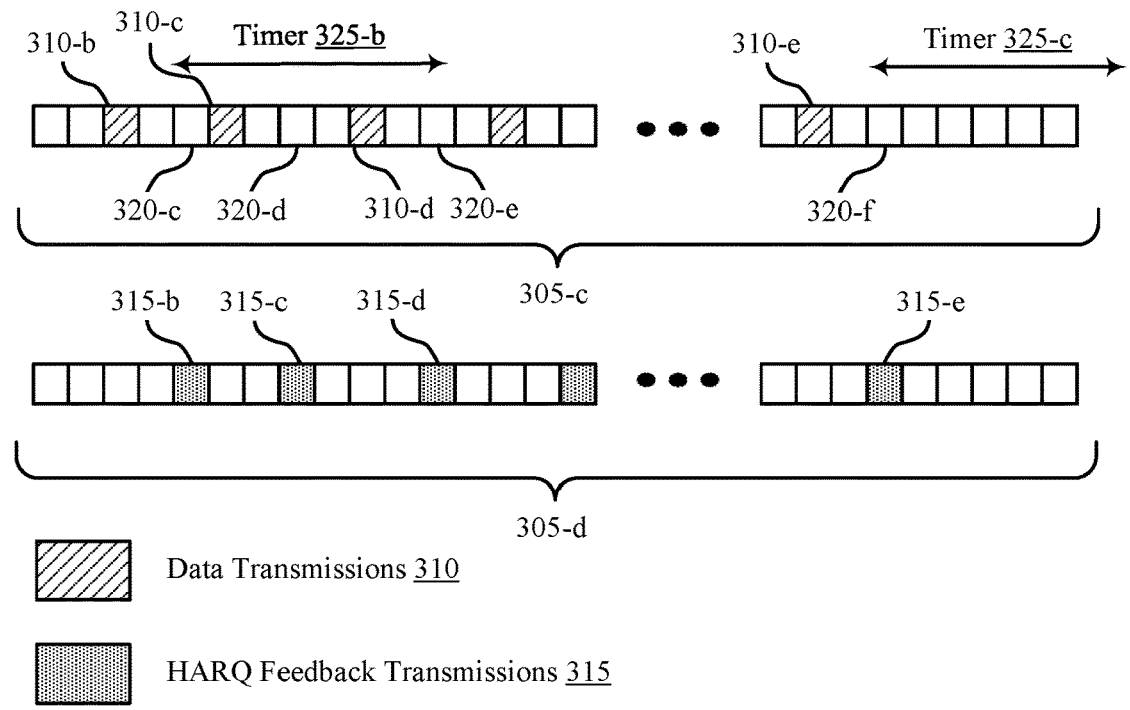

Alternatively, HARQ feedback may be received before the expiration of a timer. FIG. 3B illustrates another example of a slot diagram 302 that supports handling of sidelink RLF in accordance with aspects of the present disclosure. UEs 115 operating in a sidelink configuration may receive and transmit messages based on slot diagram 302. A first, transmitting UE 115 (e.g., UE 115-*a* as described with respect to FIG. 2) may transmit data transmissions 310 according to a transmission configuration 305-*c*. A second, receiving UE 115 (e.g., UE 115-*b*) may transmit HARQ feedback transmissions 315 based on a transmission configuration 305-*d*. A timer 325-*b* may be initiated by the transmitting UE 115 (e.g., UE 115-*a*) based on monitoring for HARQ feedback transmissions 315 received from the receiving UE 115 (e.g., UE 115-*b*).

The first UE 115 (e.g., UE 115-*a*) may transmit data transmission 310 in particular slots according to transmission configuration 305-*c*. For example, a UE 115 may transmit a first data transmission 310-*b* in a particular slot N based on transmission configuration 305-*c*. The first UE 115 may transmit first data transmission 310-*b* to the second UE 115 in a sidelink communications channel (e.g., sidelink channel 205). Based on transmitting first data transmission 310-*b*, the first UE 115 may monitor for a HARQ feedback transmission 315-*b* from the second UE 115 in a slot 320-*c* (e.g., slot N+K).

The first UE 115 may not receive an expected HARQ feedback in slot 320-*c* due to a HARQ feedback failure. Based on this HARQ feedback failure, the first UE 115 may initiate timer 325-*b* that may count down to zero until interrupted by a successful HARQ feedback. The length of timer 325-*b* may be determined based on one or more parameters. As timer 325-*b* counts down, the first UE 115 may transmit another data transmission 310-*c* and may expect a HARQ feedback transmission 315-*c* in a slot 320-*d* from the second UE 115 in response to data transmission 310-*c*. In some cases, the first UE 115 may not correctly receive HARQ feedback transmission 315-*c* in slot 320-*d* (e.g., or HARQ feedback transmission 315-*c* contains a NACK), and timer 325-*b* may continue to count down. The first UE 115 may transmit another data transmission 310-*d* to the second UE 115 over the sidelink communications channel while timer 325-*b* continues to count down. The second UE 115 may transmit a HARQ feedback transmission 315-*d* to the first UE 115 over the sidelink channel in a slot 320-*e*, where HARQ feedback transmission 315-*d* includes feedback for data transmission 310-*d*. The first UE 115 may receive HARQ feedback transmission 315-*d* in slot 320-*e* and may successfully decode HARQ feedback transmission 315-*d* (e.g., successfully decode HARQ feedback transmission 315-*d* to determine HARQ feedback transmission 315-*d* includes an ACK). HARQ feedback transmission 315-*d* may therefore be a successful HARQ feedback transmission. Based on this successful HARQ feedback transmission, the first UE 115 may reset timer 325-*b* and may not declare RLF.

The first UE 115 may re-initiate the timer 325 in later cases of HARQ feedback failures. For example, the first UE 115 may, at a later point in time, transmit a data transmission 310-*e*. Based on data transmission 310-*e*, the first UE may monitor a slot 320-*f* for an expected HARQ feedback transmission 315-*e*. In some cases, the first UE may receive HARQ feedback transmission 315-*e*, successfully decode HARQ feedback transmission 315-*e*, and determine that HARQ feedback transmission 315-*e* contains an ACK. In other cases, the first UE 115 may not receive HARQ feedback transmission 315-*e*, may receive HARQ feedback transmission 315-*e* and not be able to decode HARQ feedback transmission 315-*e*, or may decode HARQ feedback transmission 315-*e* and determine that HARQ feedback transmission 315-*e* contains a NACK. In any of these cases, the first UE 115 may determine that HARQ feedback transmission 315-*e* contains a HARQ feedback failure, and the first UE 115 may thus initiate a timer 325-*c*, which may count to a threshold time length unless a HARQ feedback transmission is a successful transmission.

Timer 325-*c* may have a same timer value as timer 325-*b* or may have a different value. For example, timer 325-*c* may have a different value in cases where a timer reconfiguration occurs. Renegotiation or reconfiguration of a timer 325 may occur in cases where one or more UE parameters have changed since a previous negotiation or renegotiation of the timer 325. Renegotiation of the timer 325 may correspond to an increase or decrease in timer value. For example, one or both of the first UE 115 and the second UE 115 may change speed. The UE speed or relative speed between the UEs may change from a high-speed category to a mid-speed category, which may necessitate a timer value change. Or, the relative UE speed may exceed satisfy a higher or lower threshold boundary, which may also cause a renegotiation of the timer value.

Congestion level may also change within the communication system which may impact the renegotiation of the timer. For example, the first or second UEs 115 may monitor an RSRQ of the communication channel and may determine that the RSRQ satisfies (e.g., exceeds) a threshold. This determination that the RSRQ satisfies the threshold may cause a renegotiation of the timer. In another case, a data priority of the data transmissions 310 may change. In these cases, a timer 325 may have a determined value based on one data priority of a first data transmission 310. When the data priority changes, the value of the timer 325 may increase (e.g., in cases where the priority decreased) or the value of the timer 325 may decrease (e.g., in cases where the priority increased). In other cases, a serving base station 105 may indicate to the one or more UEs 115 to change the timer value. This indication may be based on a changed parameter detected or signaled to the serving base station 105 by one of the UEs 115 communicating over sidelink or from another UE 115. Any of the causes of timer negotiation may initiate a timer renegotiation at the first UE 115. In some cases, the value of the timer 325 may be indicated to the UE 115 by a base station 105. In other cases, the UE 115 may determine to change the timer 325 without input from the base station 105.

In other cases, the first UE 115 may monitor HARQ feedback failures according to a counter that counts the number of failures rather than a timer 325 that counts down until a successful HARQ feedback occurs.

Figure 4A:
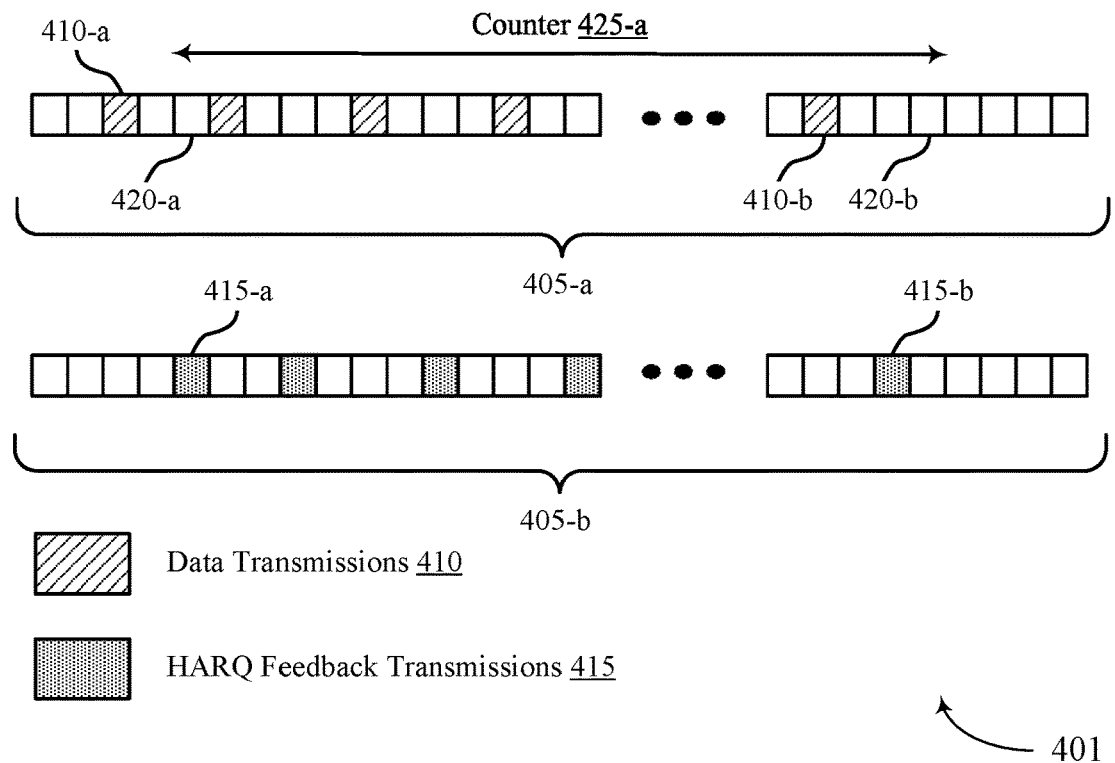
FIGS. 4A and 4B also illustrate examples of slot diagrams that support handling of sidelink RLF in accordance with aspects of the present disclosure.

FIG. 4A illustrates an example of a slot diagram 401 that supports handling of sidelink RLF in accordance with aspects of the present disclosure. Slot diagram 401 may include examples of one or more UEs 115 communicating in a sidelink configuration. A UE 115 transmitting data transmission to another UE 115 may count a number of successive HARQ feedback failures according to a counter 425. UEs 115 operating in a sidelink configuration may receive and transmit messages based on slot diagram 401. A first, transmitting UE 115 (e.g., UE 115-*a* as described with respect to FIG. 2, or the first UE 115 as described with respect to FIGS. 3A and 3B) may transmit data transmissions 410 according to example a transmission configuration 405-a. A second, receiving UE 115 (e.g., UE 115-b as described with respect to FIG. 2, or the second UE 115 as described with respect to FIGS. 3A and 3B) may transmit HARQ feedback transmissions 415 based on a transmission configuration 405-b. Counter 425-a may be initiated by the first, transmitting UE 115 (e.g., UE 115-a) based on monitoring for HARQ feedback transmissions 415 received from the second, receiving UE 115 (e.g., UE 115-b).

The first UE 115 (e.g., UE 115-a) may transmit data transmissions 410 in particular slots according to transmission configuration 405-a. For example, the first UE 115 may transmit a first data transmission 410-a in a particular slot N based on transmission configuration 405-a. The first UE 115 may transmit first data transmission 410-a to the second UE 115 in a sidelink communications channel (e.g., sidelink channel 205). Based on transmitting first data transmission 410-a, the first UE 115 may monitor for a HARQ feedback transmission 415-a from the second UE 115 in a slot 420-a (e.g., slot N+K).

In some cases, HARQ feedback transmission 415-a may correspond to a HARQ feedback failure. The HARQ feedback failure may occur based on HARQ feedback transmission 415-a being a NACK feedback transmission. In other cases, a HARQ feedback failure may include that HARQ feedback transmission 415-a is not decoded correctly at the first UE 115 (e.g., regardless of whether HARQ feedback transmission 415-a includes an ACK or a NACK). Additionally or alternatively, a HARQ feedback failure may include the first UE 115 not receiving HARQ feedback transmission 415-a. In any case of HARQ feedback failure, the first UE 115 may initiate a counter 425 based on the HARQ feedback failure.

For example, a HARQ feedback failure may occur in slot 420-a (e.g., corresponding to the slot that the second UE 115 is transmitting HARQ feedback transmission 415-a). Based on this HARQ feedback failure, the first UE 115 may initiate a counter 425-a. Counter 425-a may have a preconfigured number of failures to count up to (e.g., a preconfigured threshold number of counts) based on one or more parameters, such as data priority, speed of the first or second UE, congestion level, or another UE parameter. Counter 425-a may increment each time a HARQ feedback failure occurs until a HARQ feedback success occurs or until the preconfigured number of failures is reached.

If counter 425-a counts to the preconfigured number of failures (e.g., threshold number of failures) before a HARQ feedback is successfully received by the first UE 115, the first UE 115 may declare that an RLF has occurred. For example, counter 425-a may be configured for a preconfigured number of failures of five counts. The first UE 115 may monitor a slot 420-b for a HARQ feedback transmission 415-b based on a data transmission 410-b. Slot 420-b may be the fifth slot in which the UE 115 has monitored for a HARQ feedback transmission 415 from the second UE 115. Subsequently, a fifth HARQ failure may occur in slot 420-b. At this point, counter 425-a may have reached a threshold number of counts for the particular counter value. Thus, the first UE 115 may declare the RLF and may proceed with steps to resolve the RLF and recover sidelink communications with the second UE 115.

Figure 4B:
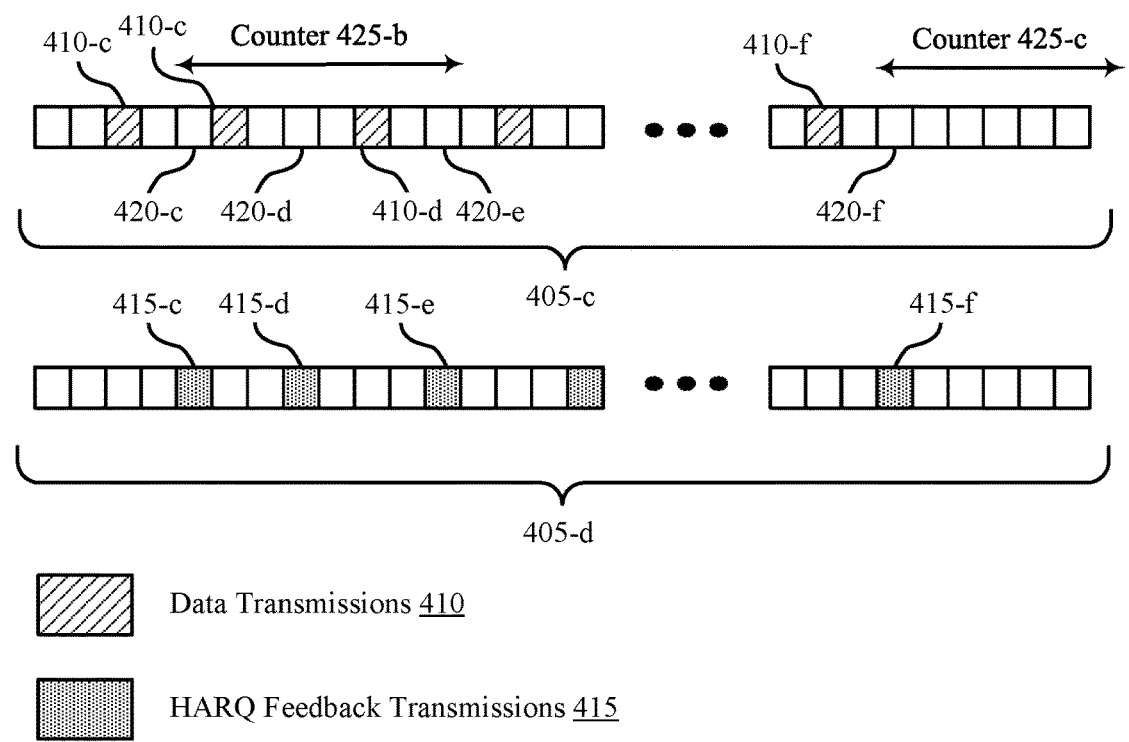

Alternatively, HARQ feedback may be received before the counter 425 reaches the threshold. FIG. 4B illustrates another example of a slot diagram 402 that supports handling of sidelink RLF in accordance with aspects of the present disclosure. UEs 115 operating in a sidelink configuration may receive and transmit messages based on slot diagram 402. A first, transmitting UE 115 may transmit data transmissions 410 according to a transmission configuration 405-c. A second, receiving UE 115 may transmit HARQ feedback transmissions 415 based on a transmission configuration 405-d. A counter 425-b may be initiated by the first, transmitting UE 115 (e.g., UE 115-a) based on monitoring for HARQ feedback transmissions 415 received from the second, receiving UE 115.

The first UE 115 (e.g., UE 115-a) may transmit data transmissions 410 in particular slots according to transmission configuration 405-c. For example, the first UE 115 may transmit a first data transmission 410-c in a particular slot N based on transmission configuration 405-c. The first UE 115 may transmit first data transmission 410-c to the second UE 115 in a sidelink communications channel (e.g., sidelink channel 205). Based on transmitting first data transmission 410-c, the first UE 115 may monitor for a HARQ feedback transmission 415-c from the second UE 115 in a slot 420-c (e.g., slot N+K).

The first UE 115 may not detect an expected HARQ feedback in slot 420-c due to a HARQ feedback failure. Based on this HARQ feedback failure, the first UE 115 may initiate counter 425-b. Counter 425-b may increment each time a HARQ feedback failure occurs, unless interrupted by an instance of a successful HARQ feedback. The first UE 115 may transmit another data transmission 410-c and may expect a HARQ feedback transmission 415-d in a slot 420-d from the second UE 115 in response to data transmission 410-c. In some cases, the first UE 115 may not detect HARQ feedback transmission 415-d in slot 420-d, and counter 425-b may increment based on this failure. The first UE 115 may transmit another data transmission 410-d to the second UE 115 over the sidelink communications channel. The second UE 115 may transmit HARQ feedback transmission 415-e to the first UE 115 over the sidelink channel in response to data transmission 410-d. The first UE 115 may receive HARQ feedback transmission 415-e in a slot 420-e and may successfully decode HARQ feedback transmission 415-e, where HARQ feedback transmission 415-e includes an ACK. HARQ feedback transmission 415-e may therefore be a successful HARQ feedback transmission. Based on this successful HARQ feedback transmission, the first UE 115 may reset counter 425-b and may not declare RLF.

The first UE 115 may re-initiate the counter 425 in later cases of HARQ feedback failure. For example, the first UE 115 may, at a later point in time, transmit a data transmission 410-f. Based on data transmission 410-f, the first UE 115 may monitor a slot 420-f for an expected HARQ feedback transmission 415-f. In some cases, the first UE 115 may receive HARQ feedback transmission 415-f, successfully decode HARQ feedback transmission 415-f, and determine that HARQ feedback transmission 415-f contains an ACK. In this case, the first UE 115 may not initiate a counter 425. In other cases, the first UE 115 may not receive HARQ feedback transmission 415-f, may receive HARQ feedback transmission 415-f and not be able to decode HARQ feedback transmission 415-f, or may be able to decode HARQ feedback transmission 415-f and determine that HARQ feedback transmission 415-f contains a NACK. In any of these cases, the first UE 115 may determine that HARQ feedback transmission 415-f includes a HARQ feedback failure, and the first UE 115 may thus initiate counter 425-c.

Counter 425-c may have the same timer value as counter 425-b or may have a different value. Counter 425-c may have a different value in cases where a counter reconfiguration occurs. Renegotiation or reconfiguration of a counter 425 may occurs in cases where one or more UE parameters has changed since a previous negotiation or renegotiation of the counter 425. Renegotiation of the counter may correspond to an increase or decrease in counter value as described previously with reference to the timer renegotiation in FIGS. 3A and 3B.

Figure 5:
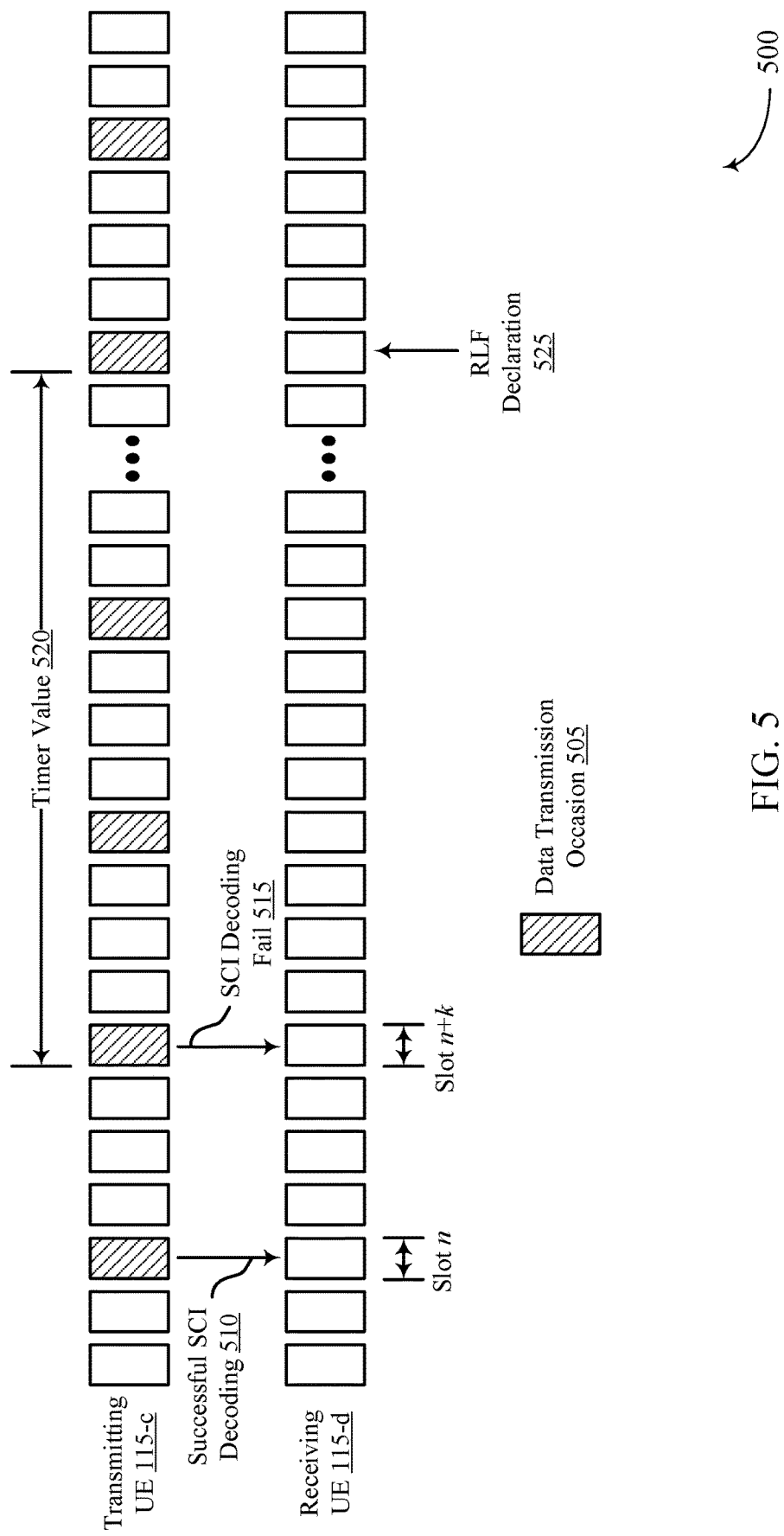
FIG. 5 illustrates an example of a receiver RLF detection timer that supports handling of sidelink RLF in accordance with aspects of the present disclosure.

FIG. 5 illustrates an example of a receiver RLF detection timer 500 that supports handling of sidelink RLF in accordance with aspects of the present disclosure. In some examples, receiver RLF detection timer 500 may implement aspects of wireless communications systems 100 and/or 200. Receiver RLF detection timer 500 may include a transmitting UE 115-*c* and a receiving UE 115-*d* that are communicating with each other over a sidelink communications link (e.g., sidelink communications channel, sidelink channel, etc.).

As described herein, in some cases, receiving UE 115-*d* may monitor for and detect an RLF based on receiver RLF detection timer 500. For example, receiving UE 115-*d* may identify one or more data transmission occasions 505 where a data transmission from transmitting UE 115-*c* can be received. In some cases, the one or more data transmission occasions 505 may further include occasions for data transmissions with SCI transmitted with the data transmissions. Receiving UE 115-*d* may identify the one or more data transmission occasions 505 based on an indication from transmitting UE 115-*c*. In some cases, receiving UE 115-*d* may perform blind SCI decoding in each data transmission occasion 505 to monitor for sidelink transmissions from transmitting UE 115-*c*.

Additionally or alternatively, data transmission occasions 505 may be configured and may occur based on a periodic transmission schedule, where receiving UE 115-*d* identifies data transmission occasions 505 based on the periodic transmission schedule. As shown, data transmission occasions 505 may be arranged according to a periodicity of four (4) TTIs or slots (e.g., a data transmission occasion 505 occurs once every four (4) TTIs or slots). As a note, for the one or more data transmission occasions 505, each data transmission occasion 505 may have a data transmission or may not. For example, transmitting UE 115-*c* may declare RLF as described above and has stopped data transmissions to receiving UE 115-*d*.

As shown in the example of FIG. 5, receiving UE 115-*d* may perform a successful SCI decoding 510 in slot n. Subsequently, a next slot (e.g., TTI) that receiving UE 115-*d* expects to decode SCI in a data transmission occasion 505 may occur in slot n+k (e.g., k=4 in the example of FIG. 5 as noted above for the periodicity of the data transmission occasions 505). However, receiving UE 115-*d* may experience an SCI decoding fail 515 in slot n+k. Accordingly, receiving UE 115-*d* may start counting down a timer with a timer value 520 (e.g., as described above with reference to FIG. 2) starting from slot n+k based on the SCI decoding fail 515.

If no SCI can be decoded before expiration of the timer (e.g., timer value 520 reaches zero (0)), receiver UE 115-*d* may declare RLF for the sidelink communications link with transmitter UE 115-*c*. Alternatively, if an SCI is decoded before expiration of the timer, receiver UE 115-*d* may reset the timer and start counting down the timer from a next failed SCI decoding. As shown in FIG. 5, receiving UE 115-*d* may reach a number of consecutive decoding failures (e.g., no SCI decoded) when the timer value 520 expires and may determine an RLF declaration 525. In some cases, timer value 520 may include a time duration that is determined as described above with reference to FIGS. 2, 3A, and 3B.

Figure 6:
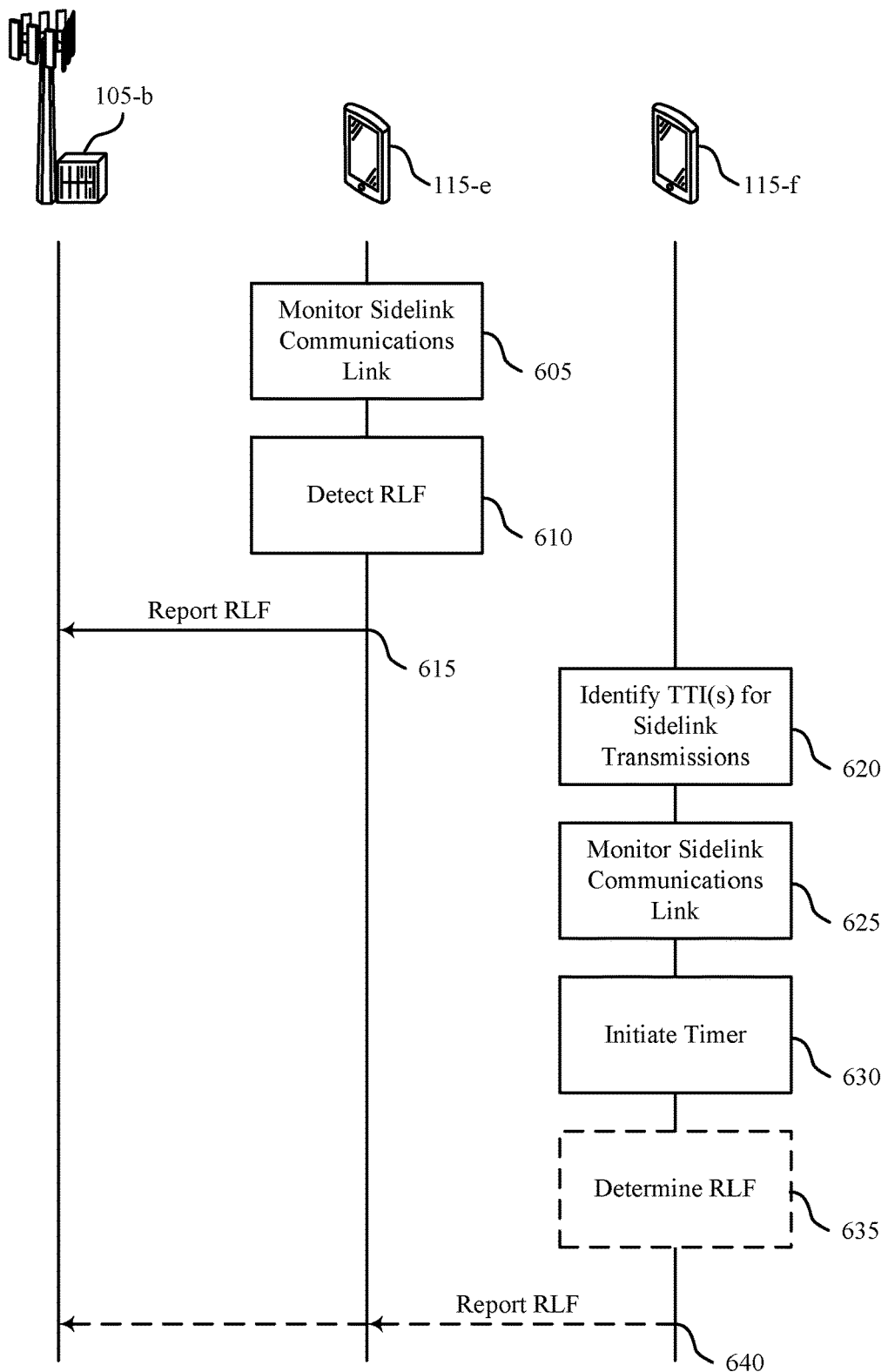
FIG. 6 illustrates an example of a process flow that supports handling of sidelink RLF in accordance with aspects of the present disclosure.

FIG. 6 illustrates an example of a process flow 600 that supports handling of sidelink RLF in accordance with aspects of the present disclosure. In some examples, process flow 600 may implement aspects of wireless communications systems 100 and/or 200. Process flow 600 may include a base station 105-*b* (e.g., a scheduling base station 105), a UE 115-*e* (e.g., a first UE), and a UE 115-*f* (e.g., a second UE), which may be examples of corresponding base stations 105 and UEs 115, respectively, as described above with reference to FIGS. 1-5. As described herein, UE 115-*e* and UE 115-*f* may communicate over a sidelink communication link, where UE 115-*e* may be referred to as a transmitting UE 115-*e* (e.g., transmitter UE) and UE 115-*f* may be referred to as a receiving UE 115-*f* (e.g., receiver UE) based on transmitting UE 115-*e* transmitting data messages to receiving UE 115-*f*.

In the following description of the process flow 600, the operations between base station 105-*b*, transmitting UE 115-*e*, and receiving UE 115-*f* may be transmitted in a different order than the order shown, or the operations performed by base station 105-*b*, transmitting UE 115-*e*, and receiving UE 115-*f* may be performed in different orders or at different times. Some operations may also be left out of the process flow 600, or other operations may be added to the process flow 600. It is to be understood that while base station 105-*b*, transmitting UE 115-*e*, and receiving UE 115-*f* are shown performing a number of the operations of process flow 600, any wireless device may perform the operations shown.

At 605, transmitting UE 115-*e* may monitor the sidelink communications link with the receiving UE 115-*f* as part of an RLM procedure for the sidelink communications link.

At 610, transmitting UE 115-*e* may detect an RLF of the sidelink communications link based on the monitoring. For example, transmitting UE 115-*e* may transmit, to receiving UE 115-*f* (e.g., the second UE) and via the sidelink communications link, one or more sidelink messages in one or more TTIs and may monitor the sidelink communications link for feedback messages (e.g., HARQ ACK feedback, ACK/NACK feedback, etc.) from receiving UE 115-*f* and in response to the one or more sidelink messages in one or more subsequent TTIs after the one or more TTIs. Accordingly, UE 115-*e* may then determine the RLF based on one or more unsuccessful receipts of the feedback messages based on the monitoring. In some cases, transmitting UE 115-*e* may refrain from transmitting messages via the sidelink communications link to receiving UE 115-*f* based on the detection of the RLF.

At 615, transmitting UE 115-*e* may report the RLF based on the detection of the RLF. For example, transmitting UE 115-*e* may transmit, to base station 105-*b*, an indication of the RLF via RRC signaling. Additionally or alternatively, transmitting UE 115-*e* may transmit, to base station 105-*b*, a request for a sidelink connection reestablishment with receiving UE 115-*f*.

Additionally or alternative to the steps described above, at 620, receiving UE 115-*f* may identify a TTI for sidelink transmissions from transmitting UE 115-*e* via the sidelink communications link.

At 625, receiving UE 115-*f* may monitor the sidelink communications link for one or more sidelink transmissions from transmitting UE 115-*e* during the TTI.

At 630, receiving UE 115-*f* may initiate a timer based on an unsuccessful receipt of the one or more sidelink transmissions in the TTI. In some cases, receiving UE 115-*f* may determine the unsuccessful receipt of the one or more sidelink transmissions based on failing to decode SCI or sidelink data during the TTI, not receiving a sidelink data transmission scheduled by SCI from transmitting UE 115-*e*, or a combination thereof. Additionally, the timer may include a timer that starts counting down based on the unsuccessful receipt of the one or more sidelink transmissions.

At 635, receiving UE 115-*f* may determine an RLF for the sidelink communications link based on the timer exceeding a threshold value. In some cases, receiving UE 115-*f* may determine the threshold value based on a pre-configured value, a value determined during establishment of the sidelink communications link, a priority level associated with data transmitted via the sidelink communications link, an indication from base station 105-*b*, or a combination thereof. For example, the value determined during establishment of the sidelink communications link may be based on a speed of transmitting UE 115-*e* or receiving UE 115-*f*, a congestion level of the sidelink communications link, the priority level associated with data transmitted via the sidelink communications link, an application for which the sidelink communications link is used, or a combination thereof.

Additionally, receiving UE 115-*f* may determine an upper bound and a lower bound for the threshold value, where the upper bound and the lower bound are based on pre-configured values, a priority level associated with data transmitted via the sidelink communications link, an application for which the sidelink communications link is used, or a combination thereof. In some cases, receiving UE 115-*f* may reconfigure the threshold value based on a change in speed of transmitting UE 115-*e* or receiving UE 115-*f*, a congestion level of the sidelink communications link, a change in a priority level associated with data transmitted via the sidelink communications link, or a combination thereof.

At 640, receiving UE 115-*f* may report the RLF based on the determination of the RLF. For example, receiving UE 115-*f* may transmit, to base station 105-*b*, an indication of the RLF via RRC signaling. Additionally or alternatively, receiving UE 115-*f* may transmit, to transmitting UE 115-*e*, an indication of the RLF via sidelink signaling (e.g., a MAC CE, RRC, etc.). In some cases, receiving UE 115-*f* may release a sidelink communications connection (e.g., the sidelink communications link) with transmitting UE 115-*e* based on the determination of the RLF.

Figure 7:
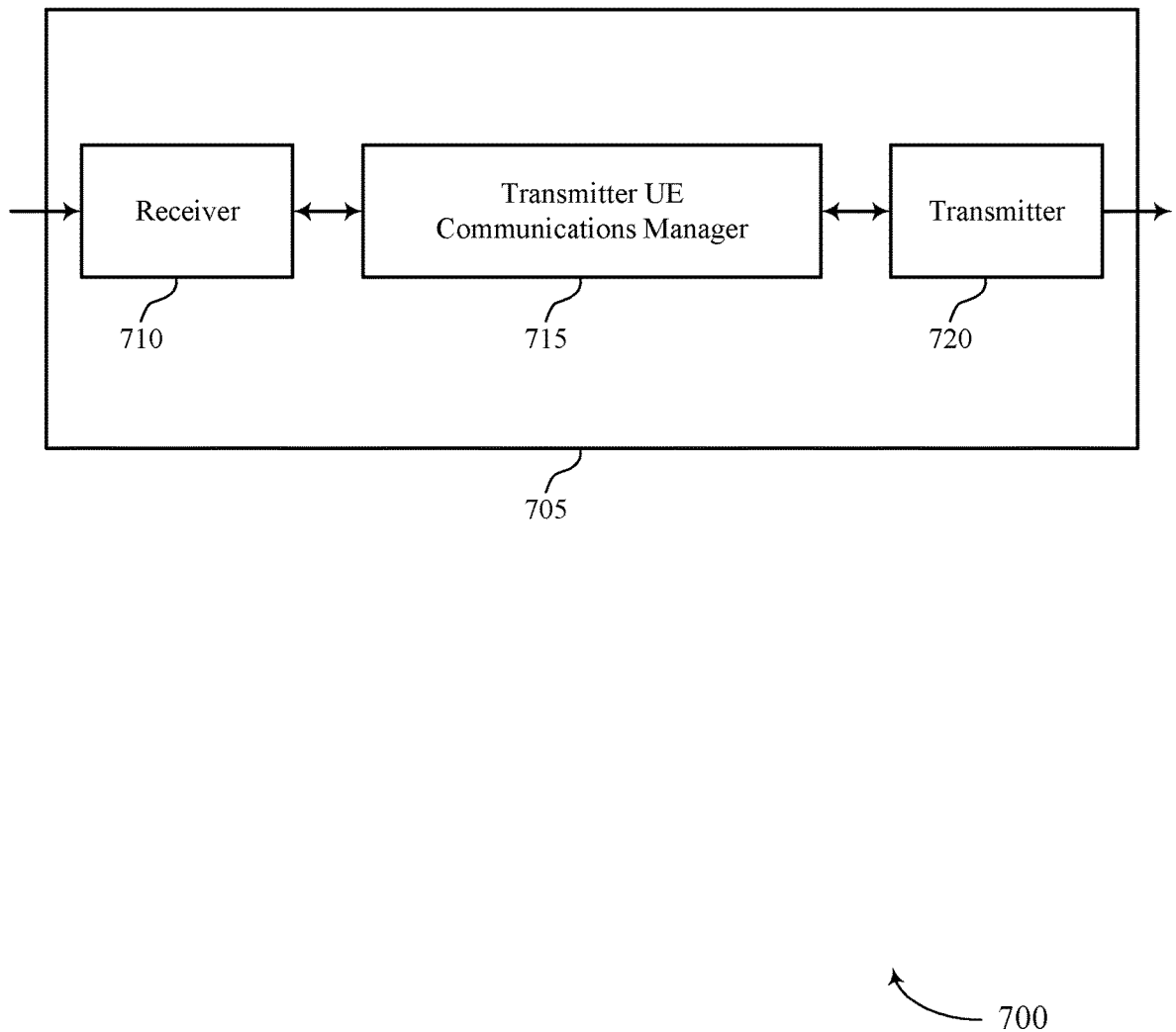
FIGS. 7 and 8 show block diagrams of devices that support handling of sidelink RLF in accordance with aspects of the present disclosure.

FIG. 7 shows a block diagram 700 of a device 705 that supports handling of sidelink RLF in accordance with aspects of the present disclosure. The device 705 may represent an example of a first UE 115 or a transmitter UE 115 as described herein. The device 705 may include a receiver 710, a transmitter UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to handling of sidelink RLF, etc.). Information may be passed on to other components of the device 705. The receiver 710 may be an example of aspects of the transceiver 920 described with reference to FIG. 9. The receiver 710 may utilize a single antenna or a set of antennas.

The transmitter UE communications manager 715 may monitor a sidelink communications link with a second UE as part of an RLM procedure for the sidelink communications link. In some cases, the transmitter UE communications manager 715 may detect an RLF of the sidelink communications link based on the monitoring. Additionally, the transmitter UE communications manager 715 may report the RLF based on the detection of the RLF. The transmitter UE communications manager 715 may be an example of aspects of the transmitter UE communications manager 910 described herein.

The transmitter UE communications manager 715, or its sub-components, may be implemented in hardware, code (e.g., software or firmware) executed by a processor, or any combination thereof. If implemented in code executed by a processor, the functions of the transmitter UE communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The transmitter UE communications manager 715, or its sub-components, may be physically located at various positions, including being distributed such that portions of functions are implemented at different physical locations by one or more physical components. In some examples, the transmitter UE communications manager 715, or its sub-components, may be a separate and distinct component in accordance with various aspects of the present disclosure. In some examples, the transmitter UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the transmitter UE communications manager 715 described herein may be implemented as a chipset of a wireless modem, and the receiver 710 and the transmitter 720 may be implemented as sets of analog components (e.g., amplifiers, filters, phase shifters, antennas, etc.) The wireless modem may obtain and decode signals from the receiver 710 over a receive interface and may output signals for transmission to the transmitter 720 over a transmit interface.

The actions performed by the transmitter UE communications manager 715 as described herein may be implemented to realize one or more advantages. One implementation may allow the device 705 to efficiently detect RLF in a sidelink communications link. This RLF detection may decrease the number of transmissions and retransmissions that may have occurred if the device 705 had not detected the RLF. Additionally, detecting the RLF on the sidelink communications link may further allow the device 705 to save power and increase battery life by performing communications more efficiently and recovering connectivity in a sidelink channel more quickly. The detection of the RLF may also lead to a more efficient use of resources, as the number of retransmissions may decrease based on declaring the RLF and recovering the sidelink communications earlier.

The transmitter 720 may transmit signals generated by other components of the device 705. In some examples, the transmitter 720 may be collocated with a receiver 710 in a transceiver module. For example, the transmitter 720 may be an example of aspects of the transceiver 920 described with reference to FIG. 9. The transmitter 720 may utilize a single antenna or a set of antennas.

Figure 8:
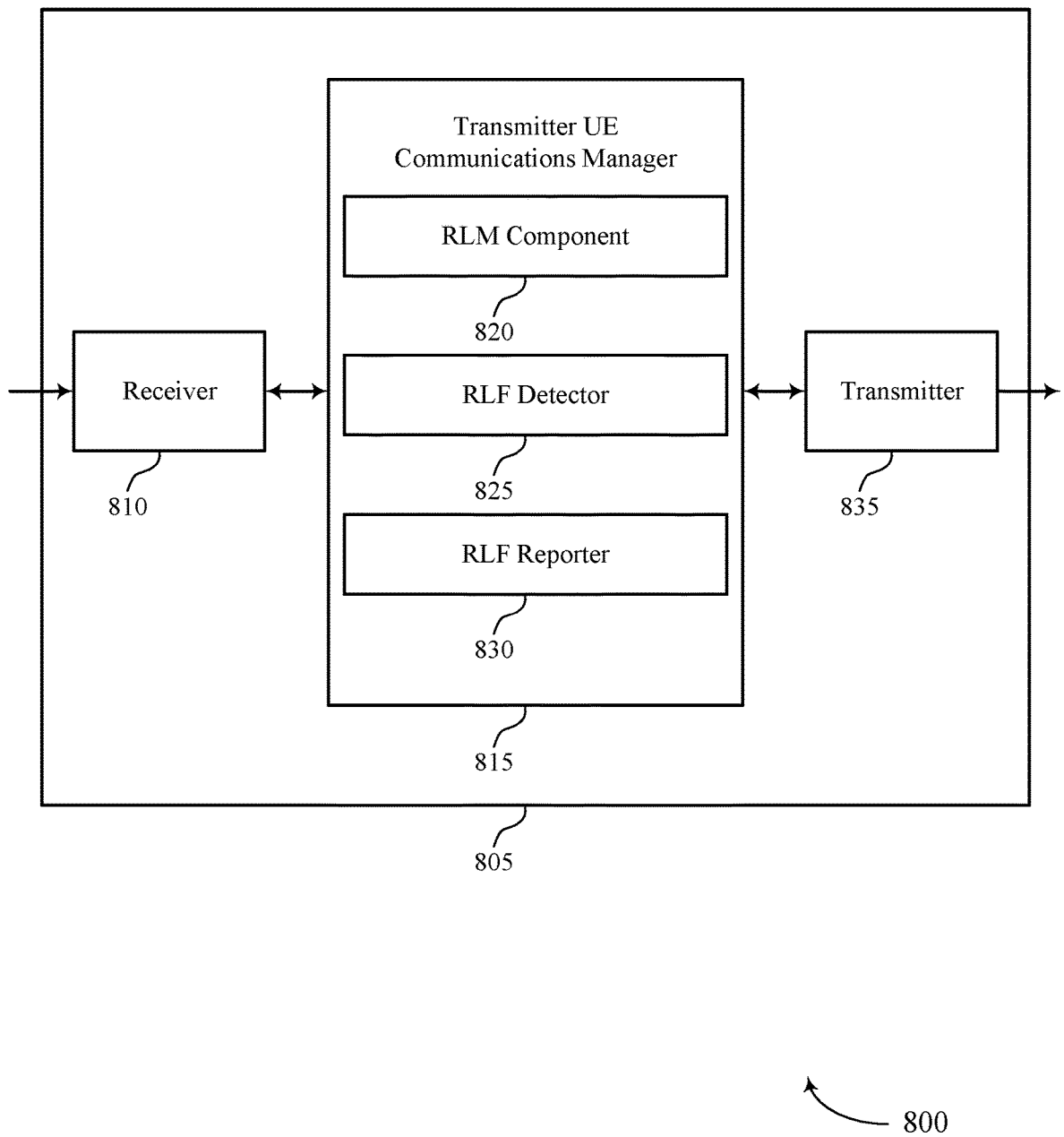

FIG. 8 shows a block diagram 800 of a device 805 that supports handling of sidelink RLF in accordance with aspects of the present disclosure. The device 805 may be an example of aspects of a device 705, a first UE 115, or a transmitter UE 115 as described herein. The device 805 may include a receiver 810, a transmitter UE communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to handling of sidelink RLF, etc.). Information may be passed on to other components of the device 805. The receiver 810 may be an example of aspects of the transceiver 920 described with reference to FIG. 9. The receiver 810 may utilize a single antenna or a set of antennas.

The transmitter UE communications manager 815 may be an example of aspects of the transmitter UE communications manager 715 as described herein. The transmitter UE communications manager 815 may include an RLM component 820, an RLF detector 825, and an RLF reporter 830. The transmitter UE communications manager 815 may be an example of aspects of the transmitter UE communications manager 910 described herein.

The RLM component 820 may monitor a sidelink communications link with a second UE as part of an RLM procedure for the sidelink communications link. In some cases, the first UE may be a transmitter UE for the sidelink communications link, and the second UE may be a receiver UE for the sidelink communications link.

The RLF detector 825 may detect an RLF of the sidelink communications link based on the monitoring. In some examples, the RLF detector 825 may transmit, to the second UE and via the sidelink communications link, one or more sidelink messages in one or more TTIs and may monitor the sidelink communications link for feedback messages from the second UE and in response to the one or more sidelink messages in one or more subsequent TTIs after the one or more TTIs. Accordingly, the RLF detector 825 may determine the RLF based on one or more unsuccessful receipts of the feedback messages based on the monitoring. Additionally, in some cases, the RLF detector 825 may refrain from transmitting messages via the sidelink communications link to the second UE based on the detection of the RLF.

The RLF reporter 830 may report the RLF based on the detection of the RLF. In some examples, the RLF reporter 830 may transmit, to a base station, an indication of the RLF via RRC signaling. Additionally or alternatively, the RLF reporter 830 may transmit, to the base station, a request for a sidelink connection reestablishment with the second UE.

The transmitter 835 may transmit signals generated by other components of the device 805. In some examples, the transmitter 835 may be collocated with a receiver 810 in a transceiver module. For example, the transmitter 835 may be an example of aspects of the transceiver 920 described with reference to FIG. 9. The transmitter 835 may utilize a single antenna or a set of antennas.

A processor of a UE 115 may initiate a timer to efficiently determine when an RLF occurs in a sidelink communications channel. Based on configuring the UE 115 to detect RLF based on the timer expiring, the processor of the UE 115 may efficiently determine that RLF has occurred and may take action to recover the sidelink communications link with one or more other UEs. The processor of the UE 115 may in some cases declare RLF, and the processor may then initiate commands to reestablish communications over the failed link or, in some cases, a new link.

Figure 9:
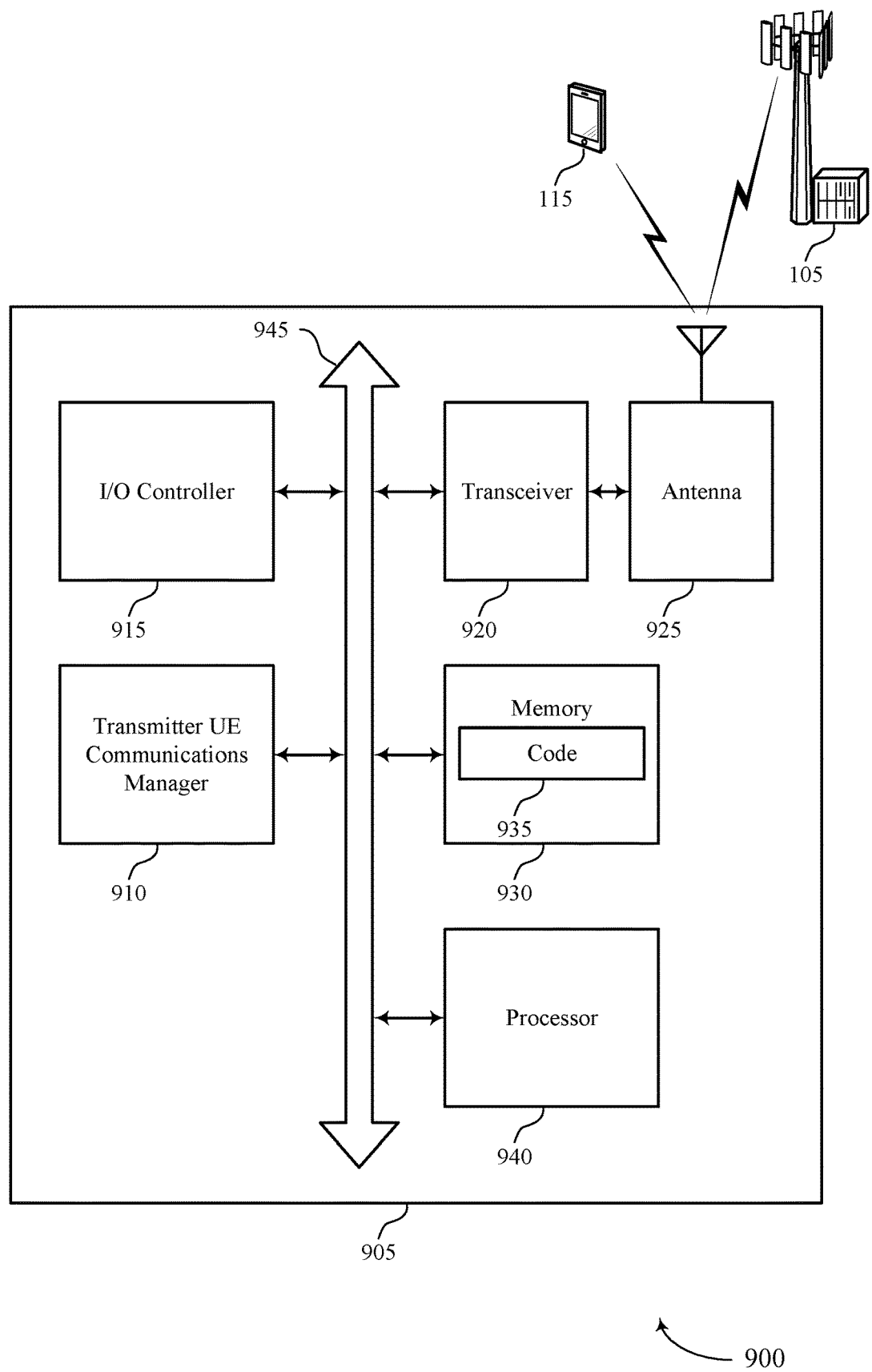
FIG. 9 shows a diagram of a system including a device that supports handling of sidelink RLF in accordance with aspects of the present disclosure.

FIG. 9 shows a diagram of a system 900 including a device 905 that supports handling of sidelink RLF in accordance with aspects of the present disclosure. The device 905 may be an example of or include the components of device 705, device 805, a first UE 115, or a transmitter UE 115 as described herein. The device 905 may include components for bi-directional voice and data communications including components for transmitting and receiving communications, including a transmitter UE communications manager 910, an I/O controller 915, a transceiver 920, an antenna 925, memory 930, and a processor 940. These components may be in electronic communication via one or more buses (e.g., bus 945).

The transmitter UE communications manager 910 may monitor a sidelink communications link with a second UE as part of a radio link monitoring procedure for the sidelink communications link. In some cases, the transmitter UE communications manager 910 may detect an RLF of the sidelink communications link based on the monitoring. Additionally, the transmitter UE communications manager 910 may report the RLF based on the detection of the RLF.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting handling of sidelink RLF).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
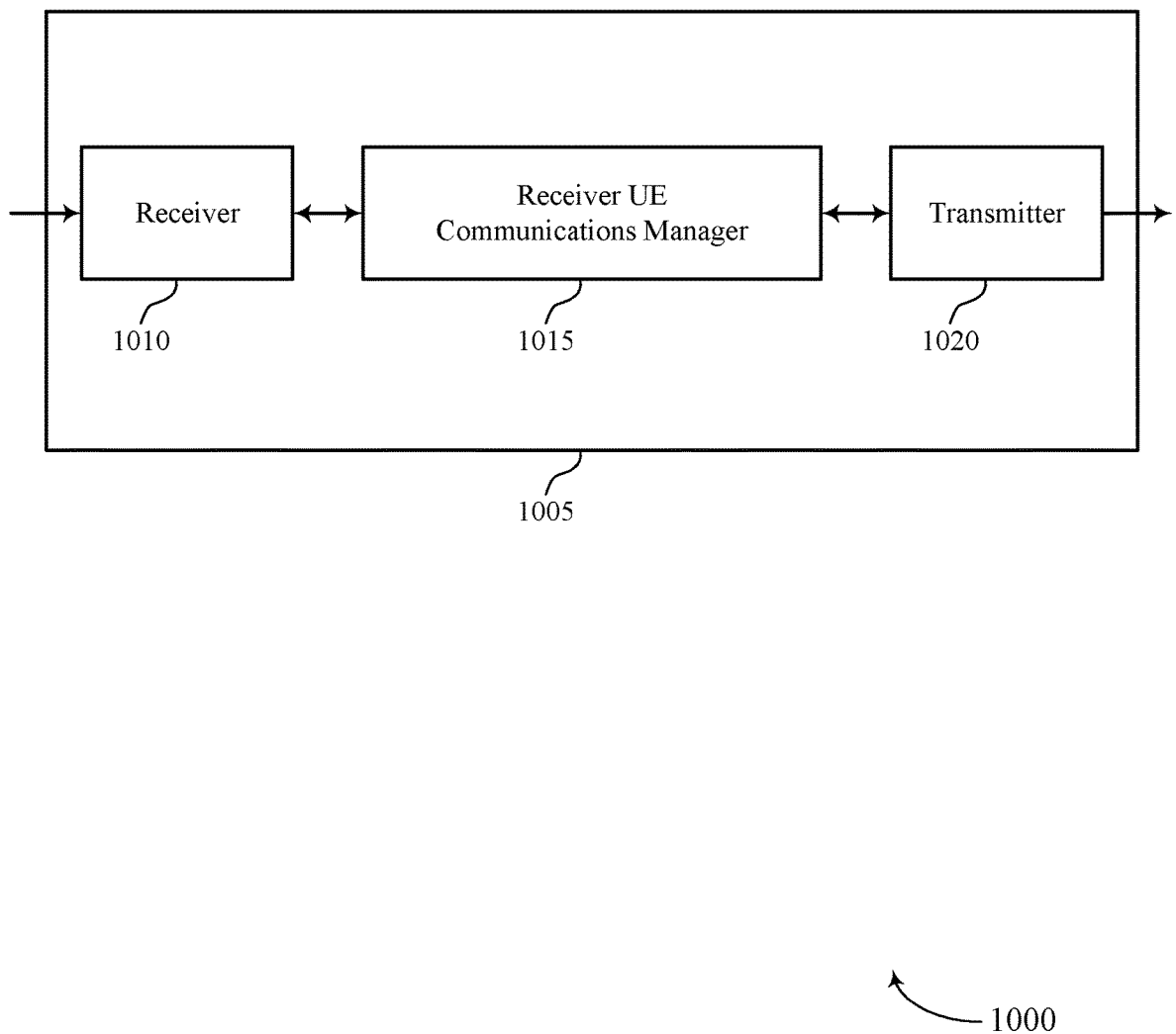
FIGS. 10 and 11 show block diagrams of devices that support handling of sidelink RLF in accordance with aspects of the present disclosure.

FIG. 10 shows a block diagram 1000 of a device 1005 that supports handling of sidelink RLF in accordance with aspects of the present disclosure. The device 1005 may represent an example of a second UE 115 or a receiver UE 115 as described herein. The device 1005 may include a receiver 1010, a receiver UE communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to handling of sidelink RLF, etc.). Information may be passed on to other components of the device 1005. The receiver 1010 may be an example of aspects of the transceiver 1320 described with reference to FIG. 13. The receiver 1010 may utilize a single antenna or a set of antennas.

The receiver UE communications manager 1015 may identify a TTI for sidelink transmissions from a first UE via a sidelink communications link. Additionally, the receiver UE communications manager 1015 may monitor the sidelink communications link for one or more sidelink transmissions from the first UE during the TTI. In some cases, the receiver UE communications manager 1015 may initiate a timer based on an unsuccessful receipt of the one or more sidelink transmissions in the TTI. The receiver UE communications manager 1015 may be an example of aspects of the receiver UE communications manager 1310 described herein.

The receiver UE communications manager 1015, or its sub-components, may be implemented in hardware, code (e.g., software or firmware) executed by a processor, or any combination thereof. If implemented in code executed by a processor, the functions of the receiver UE communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The receiver UE communications manager 1015, or its sub-components, may be physically located at various positions, including being distributed such that portions of functions are implemented at different physical locations by one or more physical components. In some examples, the receiver UE communications manager 1015, or its sub-components, may be a separate and distinct component in accordance with various aspects of the present disclosure. In some examples, the receiver UE communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

In some examples, the receiver UE communications manager 1015 described herein may be implemented as a chipset of a wireless modem, and the receiver 1010 and the transmitter 1020 may be implemented as sets of analog components (e.g., amplifiers, filters, phase shifters, antennas, etc.) The wireless modem may obtain and decode signals from the receiver 1010 over a receive interface and may output signals for transmission to the transmitter 1020 over a transmit interface.

The actions performed by the receiver UE communications manager 1015 as described herein may be implemented to realize one or more advantages. One implementation may allow the device 1005 to efficiently detect RLF in a sidelink communications link. This RLF detection may decrease the number of transmissions and retransmissions that may have occurred if the device 1005 had not detected the RLF. Additionally, detecting the RLF on the sidelink communications link may further allow the device 1005 to save power and increase battery life by performing communications more efficiently and recovering connectivity in a sidelink channel more quickly. The detection of the RLF may also lead to a more efficient use of resources, as the number of retransmissions may decrease based on declaring the RLF and recovering the sidelink communications earlier.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
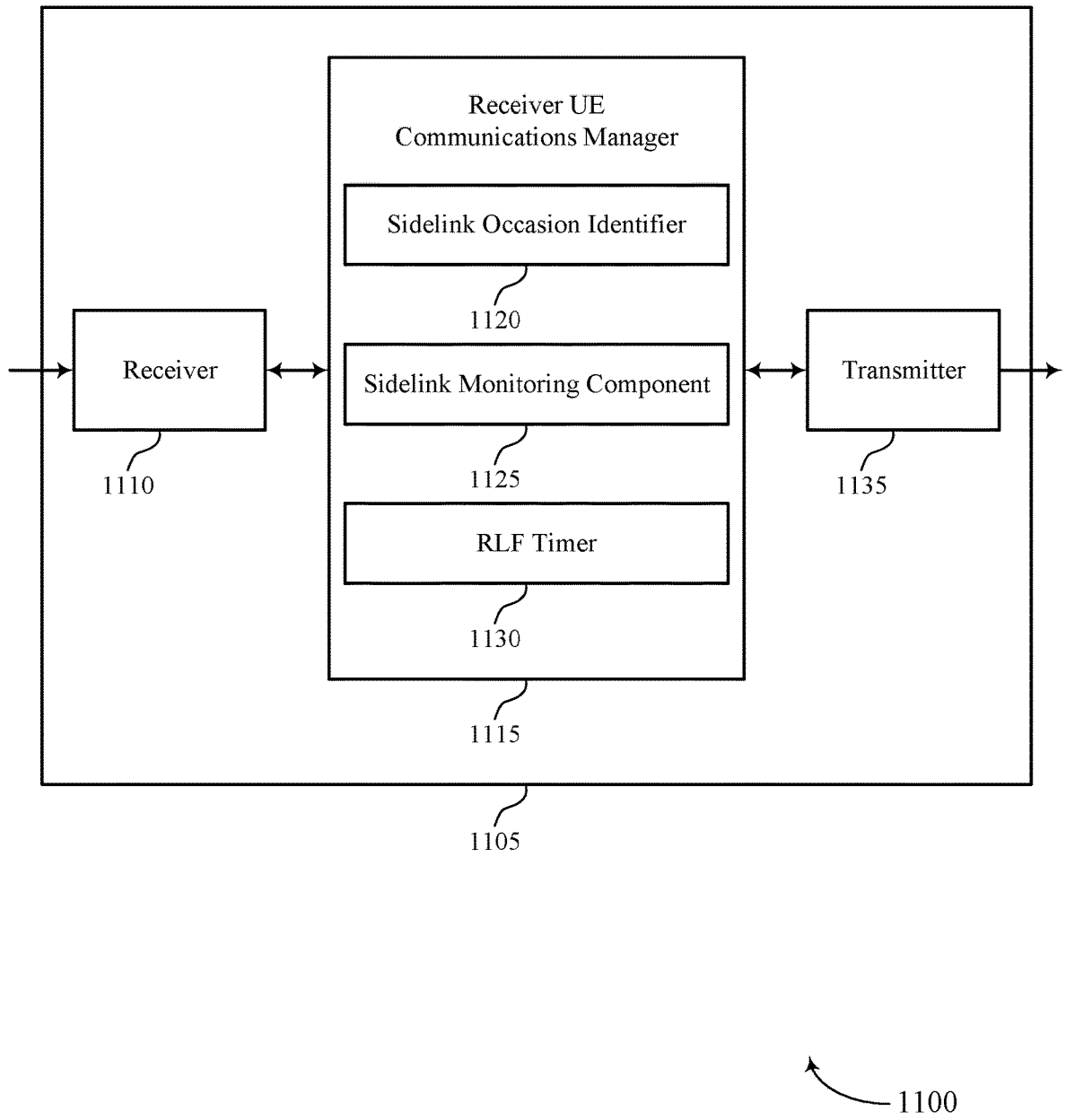

FIG. 11 shows a block diagram 1100 of a device 1105 that supports handling of sidelink RLF in accordance with aspects of the present disclosure. The device 1105 may be an example of aspects of a device 1005, a second UE 115, or a receiver UE 115 as described herein. The device 1105 may include a receiver 1110, a receiver UE communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to handling of sidelink RLF, etc.). Information may be passed on to other components of the device 1105. The receiver 1110 may be an example of aspects of the transceiver 1320 described with reference to FIG. 13. The receiver 1110 may utilize a single antenna or a set of antennas.

The receiver UE communications manager 1115 may be an example of aspects of the receiver UE communications manager 1015 as described herein. The receiver UE communications manager 1115 may include a sidelink occasion identifier 1120, a sidelink monitoring component 1125, and an RLF timer 1130. The receiver UE communications manager 1115 may be an example of aspects of the receiver UE communications manager 1310 described herein.

The sidelink occasion identifier 1120 may identify a TTI for sidelink transmissions from a first UE via a sidelink communications link.

The sidelink monitoring component 1125 may monitor the sidelink communications link for one or more sidelink transmissions from the first UE during the TTI.

The RLF timer 1130 may initiate a timer based on an unsuccessful receipt of the one or more sidelink transmissions in the TTI.

A processor of a UE 115 may initiate a timer to efficiently determine when an RLF occurs in a sidelink communications channel. Based on configuring the UE 115 to detect RLF based on the timer expiring, the processor of the UE 115 may efficiently determine that RLF has occurred and may take action to recover the sidelink communications link with one or more other UEs. The processor of the UE 115 may in some cases declare RLF, and the processor may then initiate commands to reestablish communications over the failed link or, in some cases, a new link.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
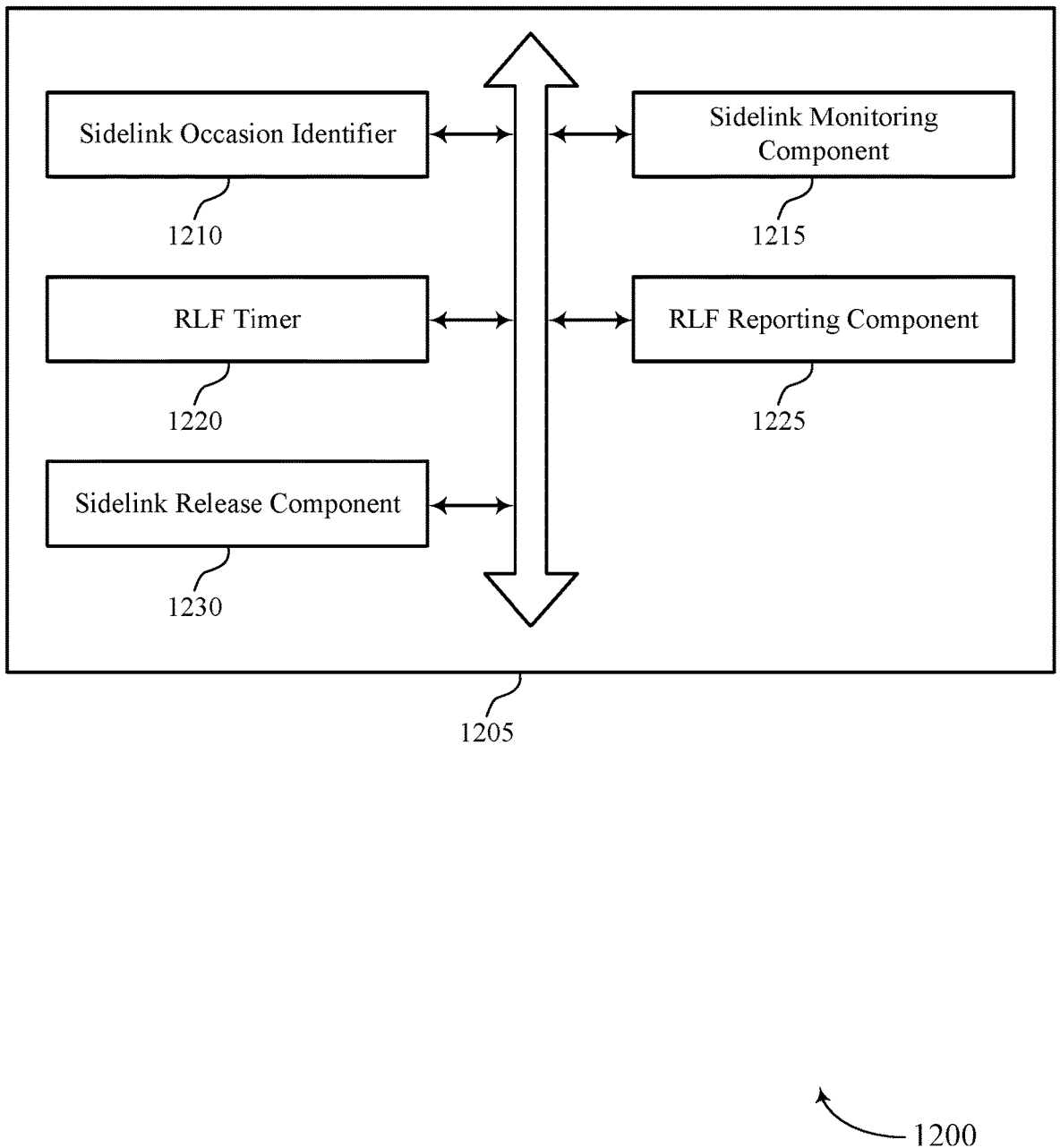
FIG. 12 shows a block diagram of a receiver user equipment (UE) communications manager that supports handling of sidelink RLF in accordance with aspects of the present disclosure.

FIG. 12 shows a block diagram 1200 of a receiver UE communications manager 1205 that supports handling of sidelink RLF in accordance with aspects of the present disclosure. The receiver UE communications manager 1205 may be an example of aspects of a receiver UE communications manager 1015, a receiver UE communications manager 1115, or a receiver UE communications manager 1310 described herein. The receiver UE communications manager 1205 may include a sidelink occasion identifier 1210, a sidelink monitoring component 1215, an RLF timer 1220, an RLF reporting component 1225, and a sidelink release component 1230. Each of these modules may communicate, directly or indirectly, with one another (e.g., via one or more buses).

The sidelink occasion identifier 1210 may identify a TTI for sidelink transmissions from a first UE via a sidelink communications link. In some cases, the first UE may be a transmitter UE for the sidelink communications link, and the second UE may be a receiver UE for the sidelink communications link.

The sidelink monitoring component 1215 may monitor the sidelink communications link for one or more sidelink transmissions from the first UE during the TTI. In some examples, the sidelink monitoring component 1215 may determine the unsuccessful receipt of the one or more sidelink transmissions based on failing to decode the SCI or sidelink data during the TTI, not receiving a sidelink data transmission scheduled by SCI from the first UE, or a combination thereof.

The RLF timer 1220 may initiate a timer based on an unsuccessful receipt of the one or more sidelink transmissions in the TTI. In some cases, the timer may include a timer that starts counting down based on the unsuccessful receipt of the one or more sidelink transmissions. For example, the RLF timer 1220 may determine an RLF for the sidelink communications link based on the timer exceeding a threshold value. In some cases, the RLF timer 1220 may determine the threshold value based on a pre-configured value, a value determined during establishment of the sidelink communications link, a priority level associated with data transmitted via the sidelink communications link, an indication from a base station, or a combination thereof. In some cases, the value determined during establishment of the sidelink communications link may be based on a speed of the first UE or the second UE, a congestion level of the sidelink communications link, the priority level associated with data transmitted via the sidelink communications link, an application for which the sidelink communications link is used, or a combination thereof.

Additionally, the RLF timer 1220 may determine an upper bound and a lower bound for the threshold value, where the upper bound and the lower bound are based on pre-configured values, a priority level associated with data transmitted via the sidelink communications link, an application for which the sidelink communications link is used, or a combination thereof. In some examples, the RLF timer 1220 may reconfigure the threshold value based on a change in speed of the first UE or the second UE, a congestion level of the sidelink communications link, a change in a priority level associated with data transmitted via the sidelink communications link, or a combination thereof.

The RLF reporting component 1225 may report the RLF based on the determination of the RLF. In some examples, the RLF reporting component 1225 may transmit, to a base station, an indication of the RLF via RRC signaling. Additionally or alternatively, the RLF reporting component 1225 may transmit, to the first UE, an indication of the RLF via sidelink signaling (e.g., a MAC CE, RRC, etc.).

The sidelink release component 1230 may release a sidelink communications connection with the first UE based on the determination of the RLF.

Figure 13:
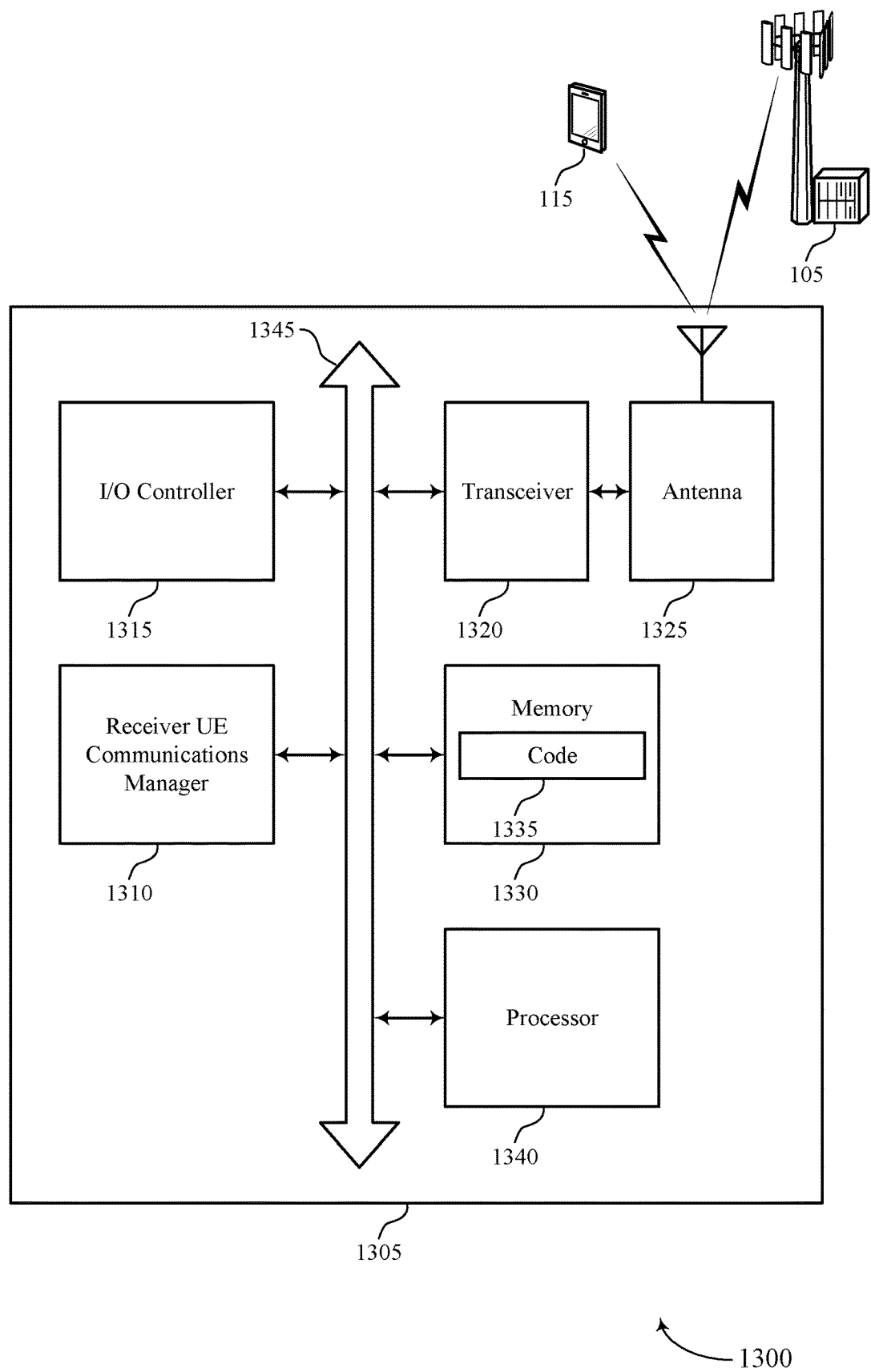
FIG. 13 shows a diagram of a system including a device that supports handling of sidelink RLF in accordance with aspects of the present disclosure.

FIG. 13 shows a diagram of a system 1300 including a device 1305 that supports handling of sidelink RLF in accordance with aspects of the present disclosure. The device 1305 may be an example of or include the components of device 1005, device 1105, a second UE 115, or a receiver UE 115 as described herein. The device 1305 may include components for bi-directional voice and data communications including components for transmitting and receiving communications, including a receiver UE communications manager 1310, an I/O controller 1315, a transceiver 1320, an antenna 1325, memory 1330, and a processor 1340. These components may be in electronic communication via one or more buses (e.g., bus 1345).

The receiver UE communications manager 1310 may identify a TTI for sidelink transmissions from a first UE via a sidelink communications link. Additionally, the receiver UE communications manager 1310 may monitor the sidelink communications link for one or more sidelink transmissions from the first UE during the TTI. In some cases, the receiver UE communications manager 1310 may initiate a timer based on an unsuccessful receipt of the one or more sidelink transmissions in the TTI.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting handling of sidelink RLF).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
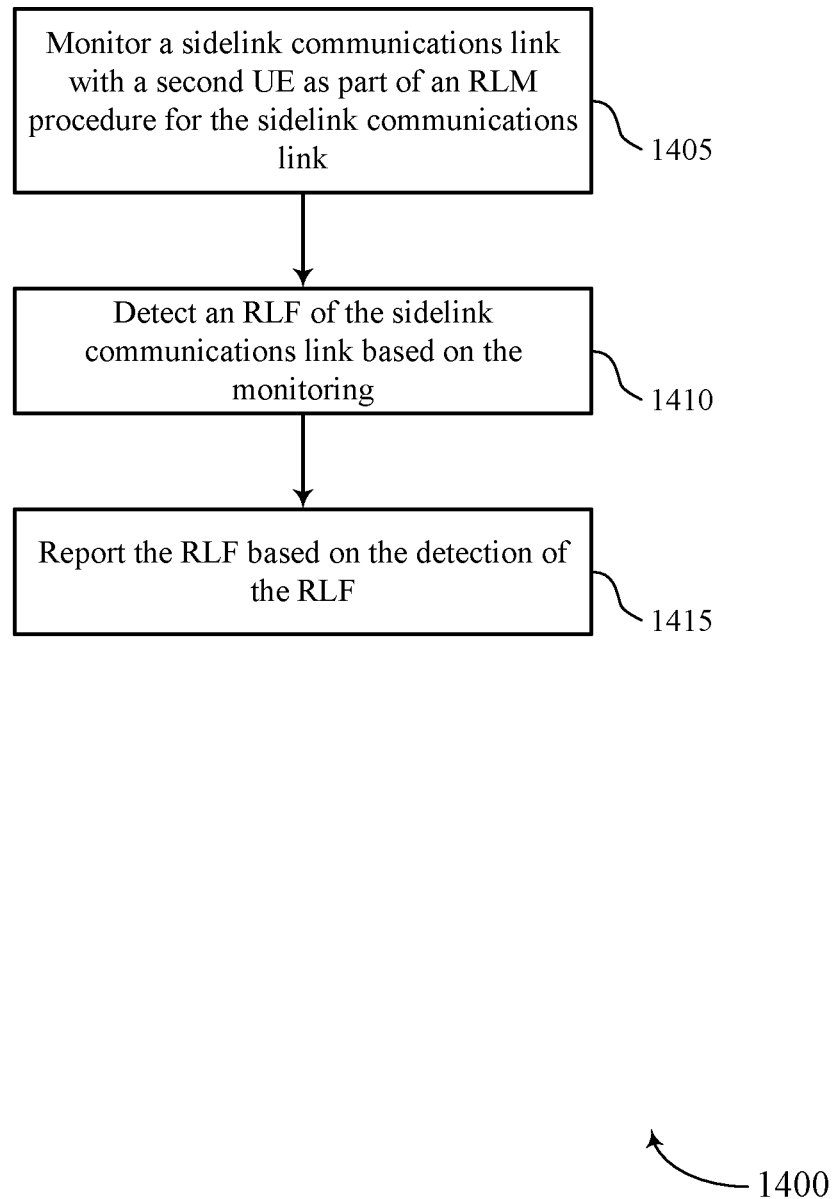
FIGS. 14 through 19 show flowcharts illustrating methods that support handling of sidelink RLF in accordance with aspects of the present disclosure.

FIG. 14 shows a flowchart illustrating a method 1400 that supports handling of sidelink RLF in accordance with aspects of the present disclosure. The operations of method 1400 may be implemented by a first UE 115 or a transmitter UE 115 or its components as described herein. For example, the operations of method 1400 may be performed by a transmitter UE communications manager as described with reference to FIGS. 7 through 9. In some examples, a UE may execute a set of instructions to control the functional elements of the UE to perform the functions described below. Additionally or alternatively, a UE may perform aspects of the functions described below using special-purpose hardware.

At 1405, the transmitter UE may monitor a sidelink communications link with a second UE (e.g., a receiver UE) as part of an RLM procedure for the sidelink communications link. The operations of 1405 may be performed according to the methods described herein. In some examples, aspects of the operations of 1405 may be performed by an RLM component as described with reference to FIGS. 7 through 9.

At 1410, the transmitter UE may detect an RLF of the sidelink communications link based on the monitoring. The operations of 1410 may be performed according to the methods described herein. In some examples, aspects of the operations of 1410 may be performed by an RLF detector as described with reference to FIGS. 7 through 9.

At 1415, the transmitter UE may report the RLF based on the detection of the RLF. The operations of 1415 may be performed according to the methods described herein. In some examples, aspects of the operations of 1415 may be performed by an RLF reporter as described with reference to FIGS. 7 through 9.

Figure 15:
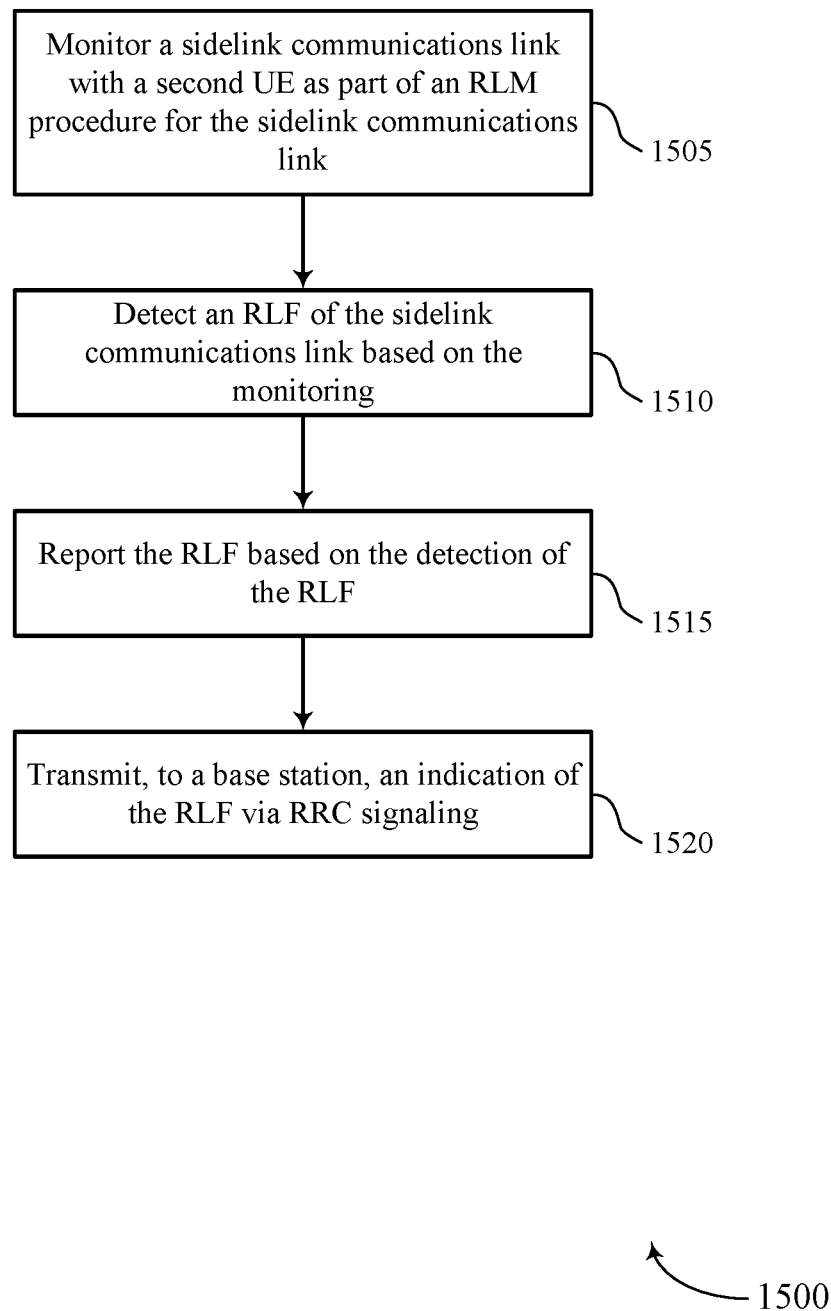

FIG. 15 shows a flowchart illustrating a method 1500 that supports handling of sidelink RLF in accordance with aspects of the present disclosure. The operations of method 1500 may be implemented by a first UE 115 or a transmitter UE 115 or its components as described herein. For example, the operations of method 1500 may be performed by a transmitter UE communications manager as described with reference to FIGS. 7 through 9. In some examples, a UE may execute a set of instructions to control the functional elements of the UE to perform the functions described below. Additionally or alternatively, a UE may perform aspects of the functions described below using special-purpose hardware.

At 1505, the transmitter UE may monitor a sidelink communications link with a second UE (e.g., a receiver UE) as part of an RLM procedure for the sidelink communications link. The operations of 1505 may be performed according to the methods described herein. In some examples, aspects of the operations of 1505 may be performed by an RLM component as described with reference to FIGS. 7 through 9.

At 1510, the transmitter UE may detect an RLF of the sidelink communications link based on the monitoring. The operations of 1510 may be performed according to the methods described herein. In some examples, aspects of the operations of 1510 may be performed by an RLF detector as described with reference to FIGS. 7 through 9.

At 1515, the transmitter UE may report the RLF based on the detection of the RLF. The operations of 1515 may be performed according to the methods described herein. In some examples, aspects of the operations of 1515 may be performed by an RLF reporter as described with reference to FIGS. 7 through 9.

At 1520, the transmitter UE may transmit, to a base station, an indication of the RLF via RRC signaling. The operations of 1520 may be performed according to the methods described herein. In some examples, aspects of the operations of 1520 may be performed by an RLF reporter as described with reference to FIGS. 7 through 9.

Figure 16:
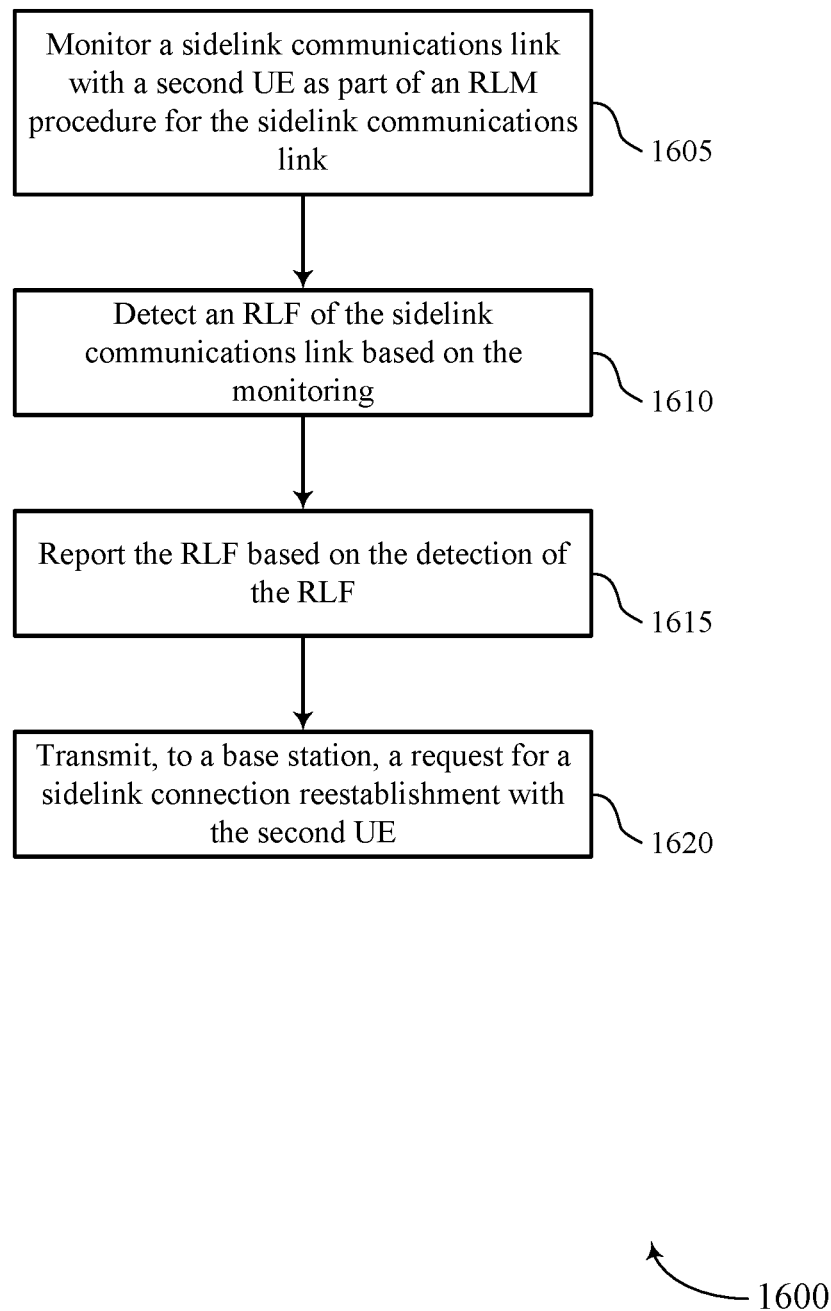

FIG. 16 shows a flowchart illustrating a method 1600 that supports handling of sidelink RLF in accordance with aspects of the present disclosure. The operations of method 1600 may be implemented by a first UE 115 or a transmitter UE 115 or its components as described herein. For example, the operations of method 1600 may be performed by a transmitter UE communications manager as described with reference to FIGS. 7 through 9. In some examples, a UE may execute a set of instructions to control the functional elements of the UE to perform the functions described below. Additionally or alternatively, a UE may perform aspects of the functions described below using special-purpose hardware.

At 1605, the transmitter UE may monitor a sidelink communications link with a second UE (e.g., a receiver UE) as part of an RLM procedure for the sidelink communications link. The operations of 1605 may be performed according to the methods described herein. In some examples, aspects of the operations of 1605 may be performed by an RLM component as described with reference to FIGS. 7 through 9.

At 1610, the transmitter UE may detect an RLF of the sidelink communications link based on the monitoring. The operations of 1610 may be performed according to the methods described herein. In some examples, aspects of the operations of 1610 may be performed by an RLF detector as described with reference to FIGS. 7 through 9.

At 1615, the transmitter UE may report the RLF based on the detection of the RLF. The operations of 1615 may be performed according to the methods described herein. In some examples, aspects of the operations of 1615 may be performed by an RLF reporter as described with reference to FIGS. 7 through 9.

At 1620, the transmitter UE may transmit, to a base station, a request for a sidelink connection reestablishment with the second UE. The operations of 1620 may be performed according to the methods described herein. In some examples, aspects of the operations of 1620 may be performed by an RLF reporter as described with reference to FIGS. 7 through 9.

Figure 17:
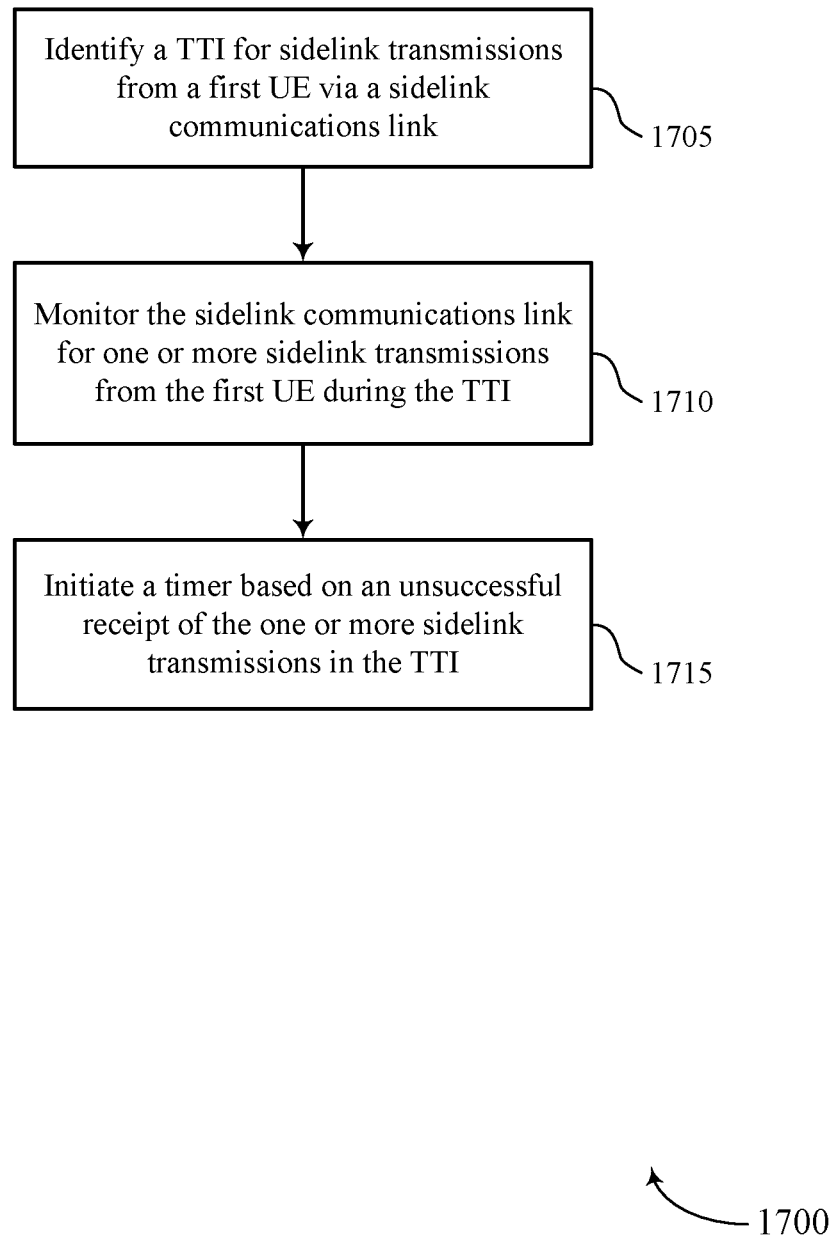

FIG. 17 shows a flowchart illustrating a method 1700 that supports handling of sidelink RLF in accordance with aspects of the present disclosure. The operations of method 1700 may be implemented by a second UE 115 or a receiver UE 115 or its components as described herein. For example, the operations of method 1700 may be performed by a receiver UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1705, the receiver UE may identify a TTI for sidelink transmissions from a first UE (e.g., a transmitter UE) via a sidelink communications link. The operations of 1705 may be performed according to the methods described herein. In some examples, aspects of the operations of 1705 may be performed by a sidelink occasion identifier as described with reference to FIGS. 10 through 13.

At 1710, the receiver UE may monitor the sidelink communications link for one or more sidelink transmissions from the first UE during the TTI. The operations of 1710 may be performed according to the methods described herein. In some examples, aspects of the operations of 1710 may be performed by a sidelink monitoring component as described with reference to FIGS. 10 through 13.

At 1715, the receiver UE may initiate a timer based on an unsuccessful receipt of the one or more sidelink transmissions in the TTI. The operations of 1715 may be performed according to the methods described herein. In some examples, aspects of the operations of 1715 may be performed by an RLF timer as described with reference to FIGS. 10 through 13.

Figure 18:
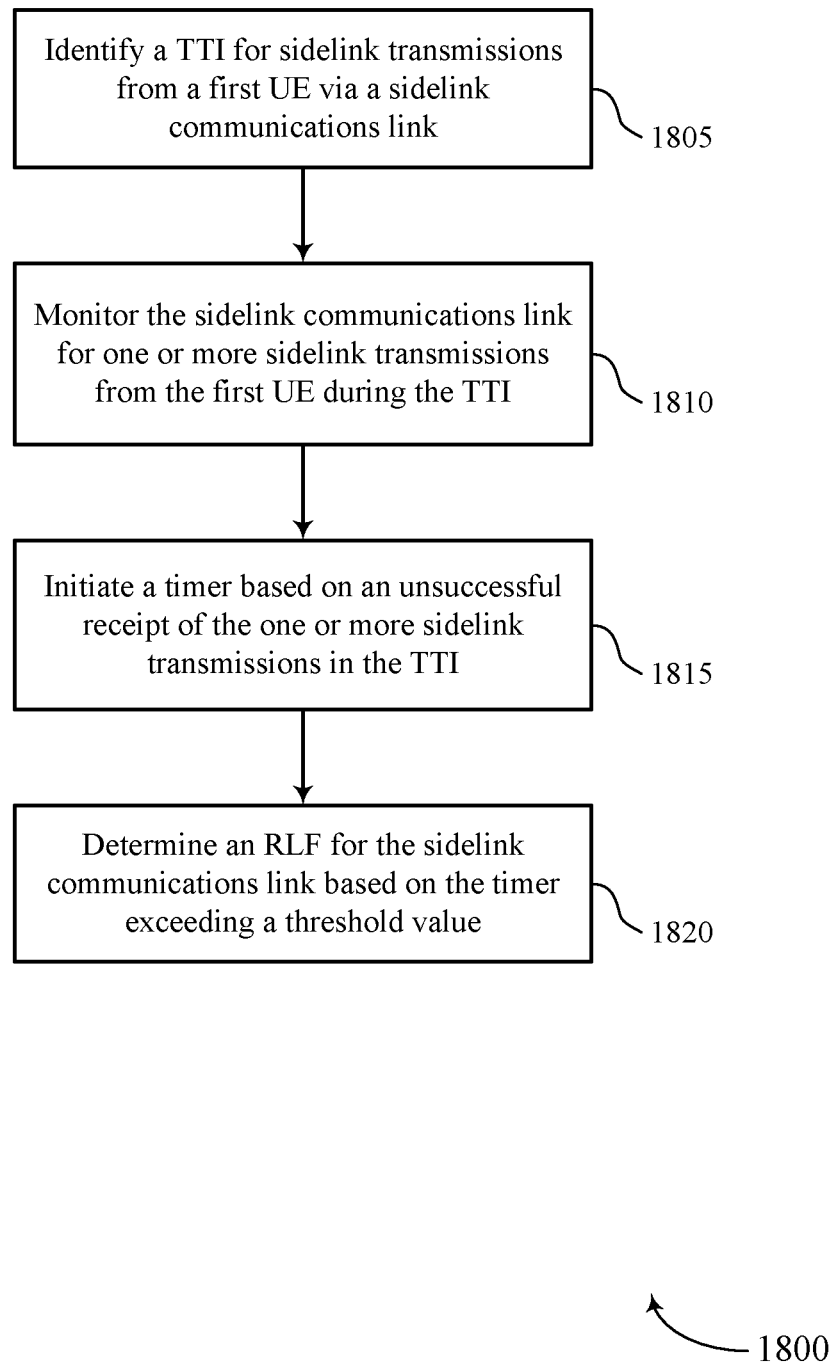

FIG. 18 shows a flowchart illustrating a method 1800 that supports handling of sidelink RLF in accordance with aspects of the present disclosure. The operations of method 1800 may be implemented by a second UE 115 or a receiver UE 115 or its components as described herein. For example, the operations of method 1800 may be performed by a receiver UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the receiver UE may identify a TTI for sidelink transmissions from a first UE (e.g., a transmitter UE) via a sidelink communications link. The operations of 1805 may be performed according to the methods described herein. In some examples, aspects of the operations of 1805 may be performed by a sidelink occasion identifier as described with reference to FIGS. 10 through 13.

At 1810, the receiver UE may monitor the sidelink communications link for one or more sidelink transmissions from the first UE during the TTI. The operations of 1810 may be performed according to the methods described herein. In some examples, aspects of the operations of 1810 may be performed by a sidelink monitoring component as described with reference to FIGS. 10 through 13.

At 1815, the receiver UE may initiate a timer based on an unsuccessful receipt of the one or more sidelink transmissions in the TTI. The operations of 1815 may be performed according to the methods described herein. In some examples, aspects of the operations of 1815 may be performed by an RLF timer as described with reference to FIGS. 10 through 13.

At 1820, the receiver UE may determine an RLF for the sidelink communications link based on the timer exceeding a threshold value. The operations of 1820 may be performed according to the methods described herein. In some examples, aspects of the operations of 1820 may be performed by an RLF timer as described with reference to FIGS. 10 through 13.

Figure 19:
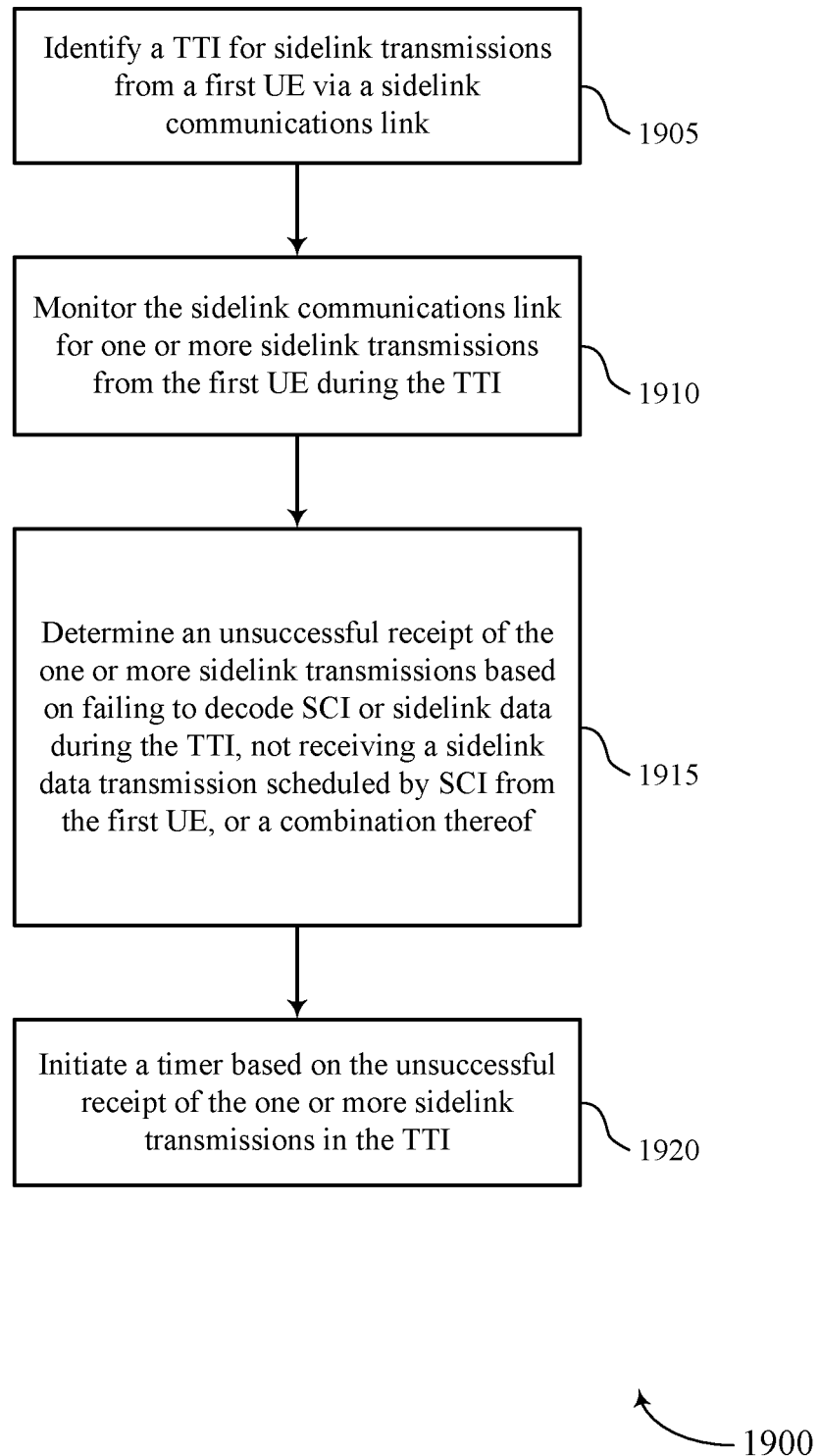

FIG. 19 shows a flowchart illustrating a method 1900 that supports handling of sidelink RLF in accordance with aspects of the present disclosure. The operations of method 1900 may be implemented by a second UE 115 or a receiving UE 115 or its components as described herein. For example, the operations of method 1900 may be performed by a receiver UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the receiver UE may identify a TTI for sidelink transmissions from a first UE (e.g., a transmitter UE) via a sidelink communications link. The operations of 1905 may be performed according to the methods described herein. In some examples, aspects of the operations of 1905 may be performed by a sidelink occasion identifier as described with reference to FIGS. 10 through 13.

At 1910, the receiver UE may monitor the sidelink communications link for one or more sidelink transmissions from the first UE during the TTI. The operations of 1910 may be performed according to the methods described herein. In some examples, aspects of the operations of 1910 may be performed by a sidelink monitoring component as described with reference to FIGS. 10 through 13.

At 1915, the receiver UE may determine the unsuccessful receipt of the one or more sidelink transmissions based on failing to decode the sidelink control information or sidelink data during the TTI, not receiving a sidelink data transmission scheduled by sidelink control information from the first UE, or a combination thereof. The operations of 1915 may be performed according to the methods described herein. In some examples, aspects of the operations of 1915 may be performed by a sidelink monitoring component as described with reference to FIGS. 10 through 13.

At 1920, the receiver UE may initiate a timer based on an unsuccessful receipt of the one or more sidelink transmissions in the TTI. The operations of 1920 may be performed according to the methods described herein. In some examples, aspects of the operations of 1920 may be performed by an RLF timer as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   transmitting, to a second UE via a sidelink communications link, one or more sidelink messages in one or more transmission time intervals;
   monitoring the sidelink communications link with the second UE for one or more feedback messages associated with the one or more sidelink messages in one or more subsequent transmission time intervals after the one or more transmission time intervals as part of a radio link monitoring procedure for the sidelink communications link;
   modifying a counter based at least in part on a receipt of the one or more feedback messages from the second UE, the one or more feedback messages indicating one or more negative acknowledgements;
   detecting a radio link failure of the sidelink communications link based at least in part on the one or more feedback messages from the second UE indicating the one or more negative acknowledgements and on the counter satisfying a threshold value, the threshold value being selected from a range of threshold values and being based at least in part on a value determined during establishment of the sidelink communications link, a priority level associated with data of the one or more sidelink messages transmitted via the sidelink communications link, or both, wherein the range of threshold values has an upper bound and a lower bound that are determined based at least in part on pre-configured values, the priority level associated with the data transmitted via the sidelink communications link, an application associated with the one or more sidelink messages, or any combination thereof; and
   reporting the radio link failure based at least in part on the detection of the radio link failure.

2. The method of claim 1, wherein reporting the radio link failure comprises:
   transmitting, to a network entity, an indication of the radio link failure via radio resource control (RRC) signaling.

3. The method of claim 1, wherein reporting the radio link failure comprises:
   transmitting, to a network entity, a request for a sidelink connection reestablishment with the second UE.

4. The method of claim 1, wherein detecting the radio link failure comprises:
   detecting the radio link failure based at least in part on one or more unsuccessful receipts of the one or more feedback messages.

5. The method of claim 1, further comprising:
   refraining from transmitting messages via the sidelink communications link to the second UE based at least in part on the detection of the radio link failure.

6. The method of claim 1, wherein the first UE comprises a transmitter UE for the sidelink communications link, and the second UE comprises a receiver UE for the sidelink communications link.

7. A method for wireless communications at a second user equipment (UE), comprising:
   identifying a transmission time interval for sidelink transmissions from a first UE via a sidelink communications link;
   monitoring the sidelink communications link for one or more sidelink transmissions from the first UE during the transmission time interval;
   initiating a timer based at least in part on an unsuccessful receipt of the one or more sidelink transmissions in the transmission time interval; and
   determining a radio link failure for the sidelink communications link based at least in part on the timer exceeding a threshold value, the threshold value being selected from a range of threshold values and is based at least in part on a value determined during establishment of the sidelink communications link, a priority level associated with data transmitted via the sidelink communications link, or both, wherein the range of threshold values has an upper bound and a lower bound that are determined based at least in part on pre-configured values, the priority level associated with the data transmitted via the sidelink communications link, an application for which the sidelink communications link is used, or any combination thereof.

8. The method of claim 7, further comprising:
   determining the threshold value based at least in part on an indication from a network entity, a preconfigured value, or both.

9. The method of claim 7, wherein the value determined during establishment of the sidelink communications link is based at least in part on a speed of the first UE or the second UE, a congestion level of the sidelink communications link, the priority level associated with data transmitted via the sidelink communications link, an application for which the sidelink communications link is used, or a combination thereof.

10. The method of claim 7, further comprising:
reconfiguring the threshold value based at least in part on a change in speed of the first UE or the second UE, a congestion level of the sidelink communications link, a change in a priority level associated with data transmitted via the sidelink communications link, or a combination thereof.

11. The method of claim 7, further comprising:
reporting the radio link failure based at least in part on the determination of the radio link failure.

12. The method of claim 11, wherein reporting the radio link failure comprises:
transmitting, to a network entity, an indication of the radio link failure via radio resource control (RRC) signaling.

13. The method of claim 11, wherein reporting the radio link failure further comprises:
transmitting, to the first UE, an indication of the radio link failure via sidelink signaling.

14. The method of claim 7, further comprising:
releasing a sidelink communications connection with the first UE based at least in part on the determination of the radio link failure.

15. The method of claim 7, further comprising:
determining the unsuccessful receipt of the one or more sidelink transmissions based at least in part on failing to decode sidelink control information or sidelink data during the transmission time interval.

16. The method of claim 7, wherein the timer comprises a timer that starts counting down based at least in part on the unsuccessful receipt of the one or more sidelink transmissions.

17. The method of claim 7, wherein the first UE comprises a transmitter UE for the sidelink communications link, and the second UE comprises a receiver UE for the sidelink communications link.

18. An apparatus for wireless communications at a first user equipment (UE), comprising:
one or more processors; and
one or more memories coupled to the one or more processors, the one or more memories storing instructions executable by the one or more processors to cause the apparatus to:
transmit, to a second UE via a sidelink communications link, one or more sidelink messages in one or more transmission time intervals;
monitor the sidelink communications link with the second UE for one or more feedback messages associated with the one or more sidelink messages in one or more subsequent transmission time intervals after the one or more transmission time intervals as part of a radio link monitoring procedure for the sidelink communications link;
modifying a counter based at least in part on a receipt of the one or more feedback messages from the second UE, the one or more feedback messages indicating one or more negative acknowledgements;
detect a radio link failure of the sidelink communications link based at least in part on the one or more feedback messages from the second UE indicating the one or more negative acknowledgements and on the counter satisfying a threshold value, the threshold value being selected from a range of threshold values and being based at least in part on a value determined during establishment of the sidelink communications link, a priority level associated with data of the one or more sidelink messages transmitted via the sidelink communications link, or both, wherein the range of threshold values has an upper bound and a lower bound that are determined based at least in part on pre-configured values, the priority level associated with the data transmitted via the sidelink communications link, an application associated with the one or more sidelink messages, or any combination thereof; and
report the radio link failure based at least in part on the detection of the radio link failure.

19. The apparatus of claim 18, wherein the instructions to report the radio link failure are executable by the one or more processors to cause the apparatus to:
transmit, to a network entity, an indication of the radio link failure via radio resource control (RRC) signaling.

20. The apparatus of claim 18, wherein the instructions to report the radio link failure are executable by the one or more processors to cause the apparatus to:
transmit, to a network entity, a request for a sidelink connection reestablishment with the second UE.

21. The apparatus of claim 18, wherein the instructions to detect the radio link failure are executable by the one or more processors to cause the apparatus to:
detect the radio link failure based at least in part on one or more unsuccessful receipts of the one or more feedback messages.

22. An apparatus for wireless communications at a second user equipment (UE), comprising:
one or more processors; and
one or more memories coupled to the one or more processors, the one or more memories storing instructions executable by the one or more processors to cause the apparatus to:
identify a transmission time interval for sidelink transmissions from a first UE via a sidelink communications link;
monitor the sidelink communications link for one or more sidelink transmissions from the first UE during the transmission time interval;
initiate a timer based at least in part on an unsuccessful receipt of the one or more sidelink transmissions in the transmission time interval; and
determine a radio link failure for the sidelink communications link based at least in part on the timer exceeding a threshold value, the threshold value being selected from a range of threshold values and is based at least in part on a value determined during establishment of the sidelink communications link, a priority level associated with data transmitted via the sidelink communications link, or both, wherein the range of threshold values has an upper bound and a lower bound that are determined based at least in part on pre-configured values, the priority level associated with the data transmitted via the sidelink communications link, an application for which the sidelink communications link is used, or any combination thereof.

23. The apparatus of claim 22, wherein the instructions are further executable by the one or more processors to cause the apparatus to:

determine the threshold value based at least in part on an indication from a network entity, a preconfigured value, or both.

24. The apparatus of claim 22, wherein the value determined during establishment of the sidelink communications link is based at least in part on a speed of the first UE or the second UE, a congestion level of the sidelink communications link, the priority level associated with data transmitted via the sidelink communications link, an application for which the sidelink communications link is used, or a combination thereof.

25. The apparatus of claim 22, wherein the instructions are further executable by the one or more processors to cause the apparatus to:
    reconfigure the threshold value based at least in part on a change in speed of the first UE or the second UE, a congestion level of the sidelink communications link, a change in a priority level associated with data transmitted via the sidelink communications link, or a combination thereof.

26. The apparatus of claim 22, wherein the instructions are further executable by the one or more processors to cause the apparatus to:
    report the radio link failure based at least in part on the determination of the radio link failure.

* * * * *